US011356578B2

(12) United States Patent
    Eguchi

(10) Patent No.: US 11,356,578 B2
(45) Date of Patent: Jun. 7, 2022

(54) APPARATUS AND CONTROL METHOD FOR ENHANCEMENT BASED ON ACHROMATIC SIGNAL VALUE REPLACING PIXEL COLOR INFORMATION

(71) Applicant: CANON KABUSHIKI KAISHA, Tokyo (JP)

(72) Inventor: Kimimori Eguchi, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/223,436

(22) Filed: Apr. 6, 2021

(65) Prior Publication Data

US 2021/0319274 A1    Oct. 14, 2021

(30) Foreign Application Priority Data

Apr. 10, 2020   (JP) .............................. JP2020-071151

(51) Int. Cl.
    *H04N 1/40*     (2006.01)
    *G06K 15/02*    (2006.01)
    *H04N 1/409*    (2006.01)

(52) U.S. Cl.
    CPC ....... *H04N 1/40012* (2013.01); *G06K 15/188* (2013.01); *G06K 15/1822* (2013.01); *G06K 15/1826* (2013.01); *H04N 1/4092* (2013.01)

(58) Field of Classification Search
    CPC ............. H04N 1/40012; H04N 1/4092; G06K 15/1826; G06K 15/188
    See application file for complete search history.

(56) References Cited

U.S. PATENT DOCUMENTS

2015/0015918 A1* 1/2015 Eguchi .................... G06T 5/001
                                                        358/3.27

FOREIGN PATENT DOCUMENTS

JP          2017038242 A      2/2017

* cited by examiner

*Primary Examiner* — Scott A Rogers
(74) *Attorney, Agent, or Firm* — Canon U.S.A., Inc. IP Division

(57) ABSTRACT

An apparatus configured to generate image data represented in achromatic color from input image data and output the generated image data to a printer includes a controller. The controller is configured to replace color information of an object included in the input image data with an achromatic signal value, determine, based on an achromatic signal value corresponding to color information of a pixel of interest in the input image data, whether the pixel of interest satisfies a predetermined condition, and perform enhancement processing on the color information of the pixel of interest in a case where the pixel of interest is determined not to satisfy the predetermined condition.

20 Claims, 25 Drawing Sheets

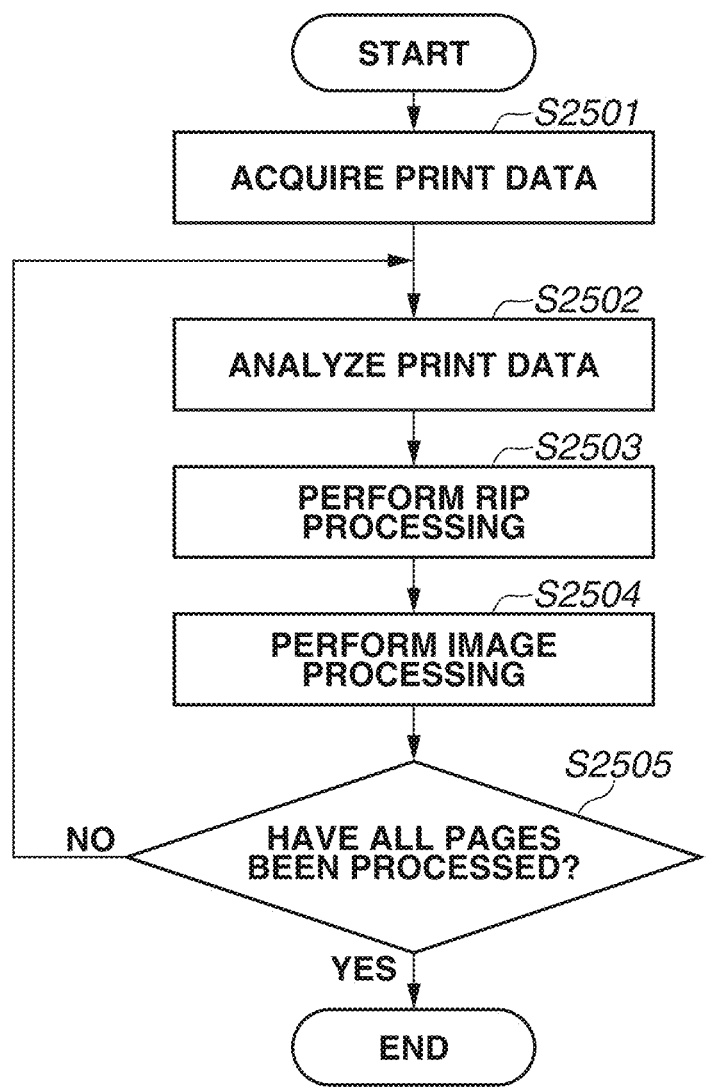

FIG.4A
```
1 Page Start
2 Set Page Color (CL) — 401
3 Set Color (95, 155, 213) — 402
4 Draw Polygon — 403
5 Set Text Size (16) — 404
6 Set Font (Arial) — 405
7 Set Color (237, 125, 49)
8 Draw Text ("A") — 406
9 Draw Text ("B")
10 Draw Text ("C")
11 Set Color (237, 125, 49)
12 Draw Polygon
13 Set Color (95, 155, 213)
14 Draw Polygon
15 Set Color (112, 173, 71)
16 Draw Polygon
17 Set Color (255, 192, 0)
18 Draw Polygon
19 Set Color (145, 145, 145)
20 Draw Polygon
21 Page End
```
— 400
FIG.4B
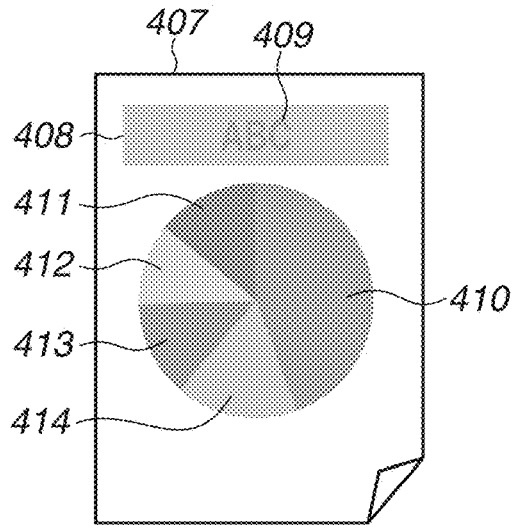
FIG.4C
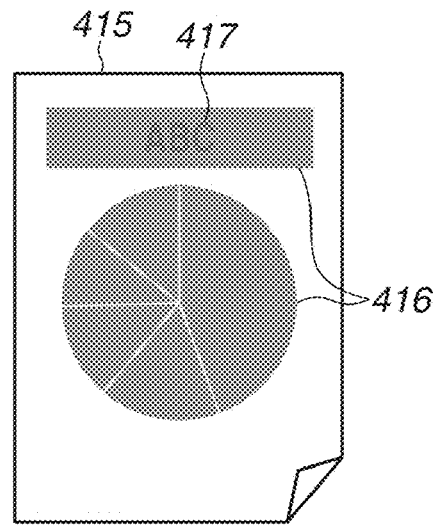

| INPUT IMAGE | R | G | B | Gray |
|---|---|---|---|---|
| 408 | 95 | 155 | 213 | 144 |
| 409 | 237 | 125 | 49 | 150 |
| 410 | 237 | 125 | 49 | 150 |
| 411 | 145 | 145 | 145 | 145 |
| 412 | 255 | 192 | 0 | 189 |
| 413 | 112 | 173 | 71 | 143 |
| 414 | 95 | 155 | 213 | 144 |

| INPUT IMAGE | R | G | B | Gray | DIFFERENCE |
|---|---|---|---|---|---|
| 413 | 112 | 173 | 71 | 143 | 1 |
| 408 | 95 | 155 | 213 | 144 | 0 |
| 414 | 95 | 155 | 213 | 144 | 1 |
| 411 | 145 | 145 | 145 | 145 | 5 |
| 409 | 237 | 125 | 49 | 150 | 0 |
| 410 | 237 | 125 | 49 | 150 | 39 |
| 412 | 255 | 192 | 0 | 189 | |

FIG.18C

FIG.19A
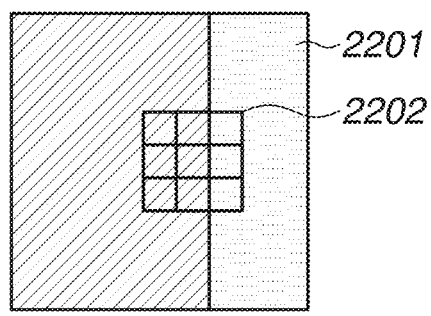
FIG.19B
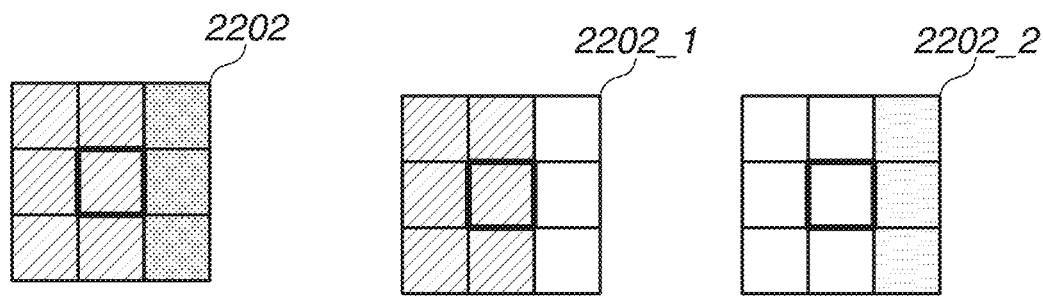
FIG.19C
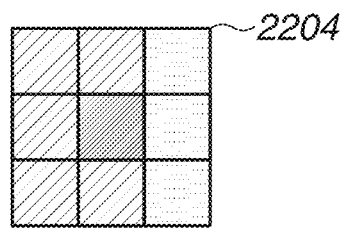
FIG.19D
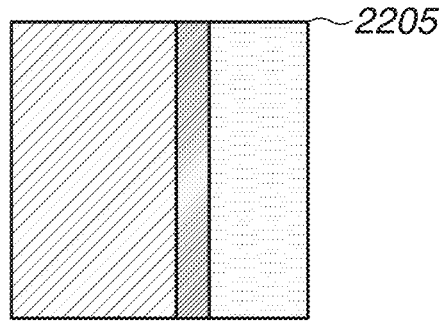
FIG.19E

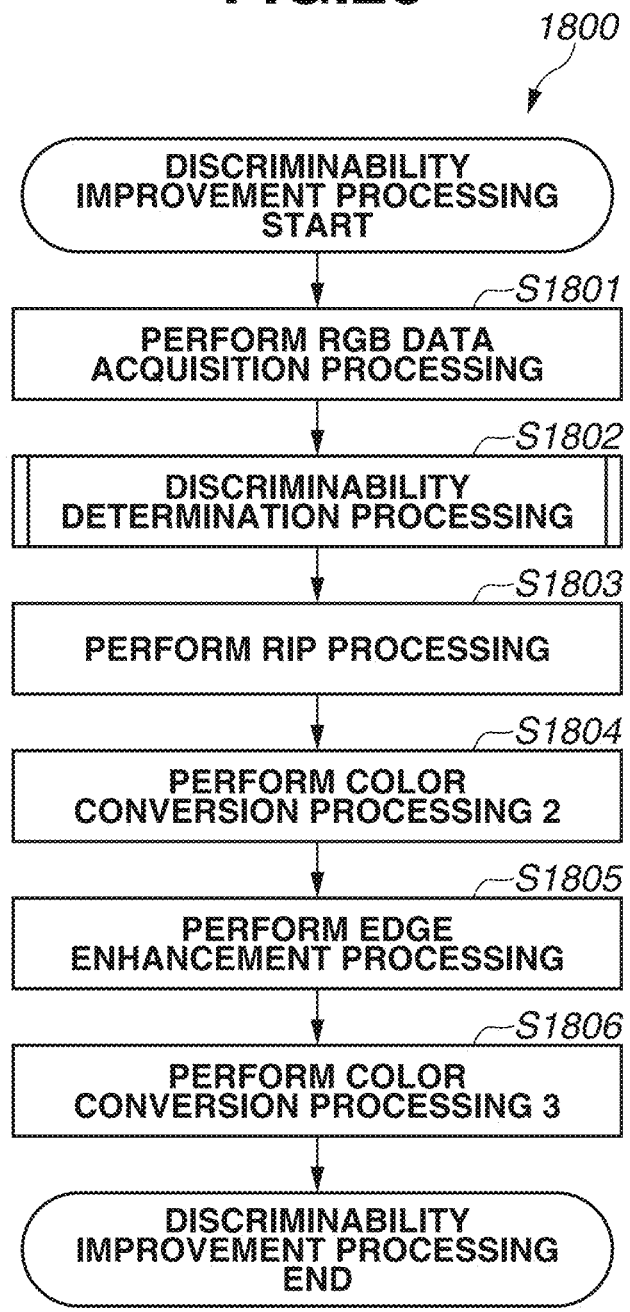

APPARATUS AND CONTROL METHOD FOR ENHANCEMENT BASED ON ACHROMATIC SIGNAL VALUE REPLACING PIXEL COLOR INFORMATION

BACKGROUND OF THE DISCLOSURE

Field of the Disclosure

The aspect of the embodiments relates to an apparatus and a method for controlling the apparatus.

Description of the Related Art

In recent years, documents and presentation documents have been prepared in color in general offices. However, there is a case where a document prepared in color is printed in monochrome (black monochrome). In a case where a color document is printed in monochrome, an image processing apparatus performs processing for converting color data into grayscale data.

In a case where the color data of the document is represented in red (R), green (G), and blue (B), it is common that the image processing apparatus performs the conversion processing by using a method called National Television System Committee (NTSC) conversion. In the NTSC conversion, a weighted average of RGB values is calculated to obtain a gray value corresponding to the RGB values by using the following formula: 0.299*R+0.587*G+0.114*B. However, this method has an issue that a plurality of completely different colors in the color document becomes the same gray value or similar gray values after subjected to the NTSC conversion, and discriminability of the plurality of different colors deteriorates.

While examples of the method for converting color data to gray data include, besides the NTSC conversion method, a method of applying equal weights to the RGB values to obtain an gray value, and a method of applying varied weights to the RGB values to obtain a gray value, these methods also have the issue that the discriminability of different colors deteriorates similarly to the NTSC conversion.

Japanese Patent Application Laid-Open No. 2017-38242 discusses a technique in which, in a case where the number of colors used in color data is equal to or smaller than a predetermined number, a table for converting the color data to gray data is created so that gray values after the conversion are away from each other. For example, supposing that the color data is 8-bit image data, a table is created so that gray values are equally separated in the possible range from 0 to 255. In the technique discussed in Japanese Patent Application Laid-Open No. 2017-38242, color data is converted to gray data using this table to improve the discriminability of colors.

SUMMARY OF THE DISCLOSURE

According to an aspect of the embodiments, an apparatus configured to generate image data represented in achromatic color from input image data and output the generated image data to a printer includes a controller having one or more processors which execute instructions stored in one or more memories, the controller being configured to replace color information of an object included in the input image data with an achromatic signal value, determine, based on an achromatic signal value corresponding to color information of a pixel of interest in the input image data, whether the pixel of interest satisfies a predetermined condition, and perform enhancement processing on the color information of the pixel of interest in a case where the pixel of interest is determined not to satisfy the predetermined condition.

Further features of the disclosure will become apparent from the following description of exemplary embodiments with reference to the attached drawings.

BRIEF DESCRIPTION OF THE DRAWINGS

FIG. 3 is a flowchart illustrating a print processing procedure.

FIG. 4A is a diagram illustrating an example of a drawing command. FIG. 4B is a diagram illustrating an example of a raster image. FIG. 4C is a diagram illustrating an example of attribute information.

FIGS. 8A and 8B are tables each illustrating an example of a color value list.

FIGS. 18A to 18E are diagrams illustrating an example of sharpness processing.

FIGS. 19A to 19E are diagrams illustrating an example of trapping processing.

FIG. 20 is a flowchart illustrating another example of the discriminability improvement processing.

DESCRIPTION OF THE EMBODIMENTS

Exemplary embodiments of the disclosure will be described in detail below with reference to the accompanying drawings. The following exemplary embodiments do not limit the disclosure according to the claims, and all combinations of features described in the exemplary embodiments are not necessarily essential to a means of solving issues of the disclosure. In the exemplary embodiments, a description will be given using an image processing apparatus as an example of an information processing apparatus.

<Image Forming Apparatus>

Figure 1:
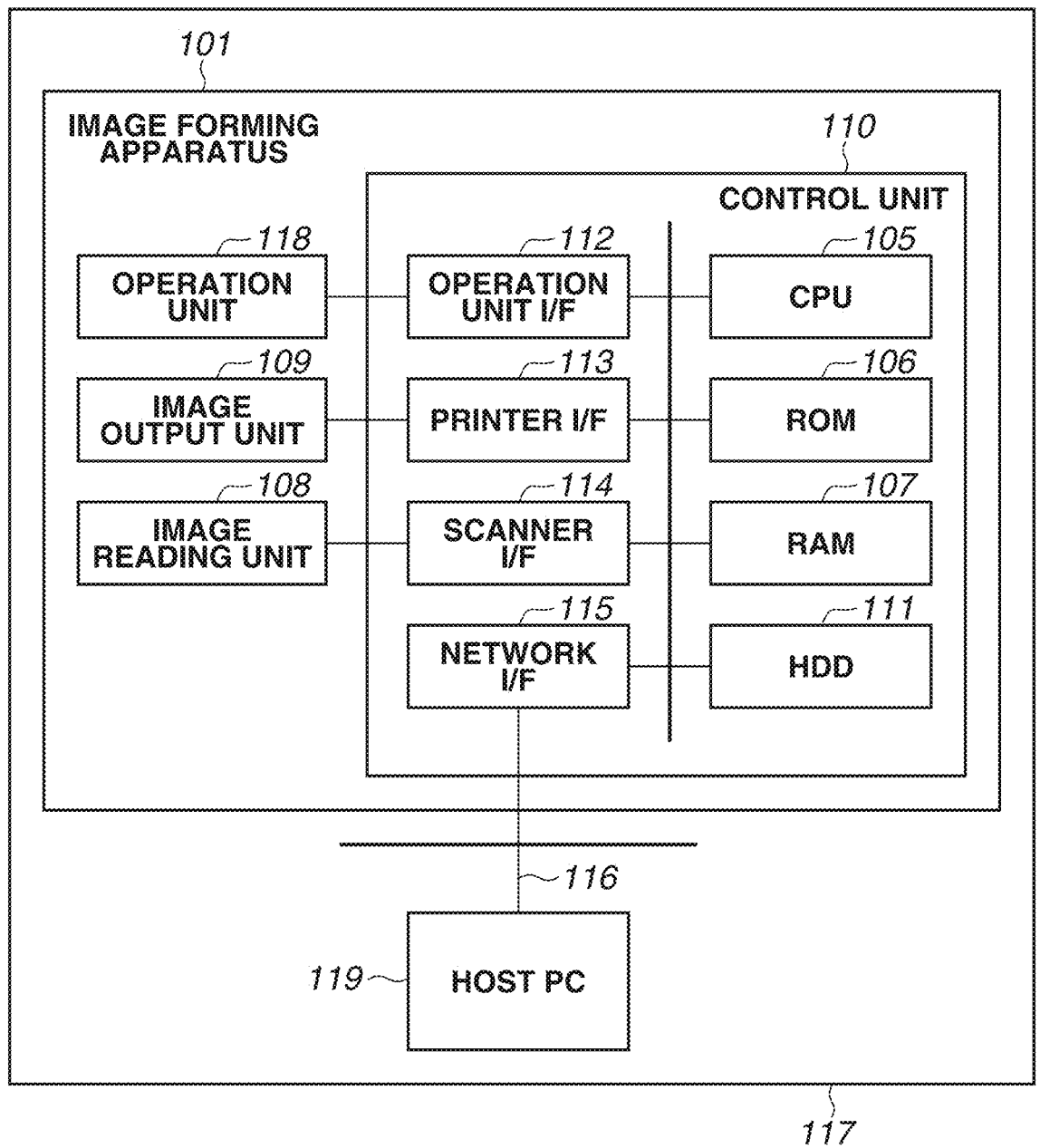
FIG. 1 is a block diagram illustrating a configuration of an image processing system.

FIG. 1 illustrates an example of an image processing system 117 according to a first exemplary embodiment of the disclosure. The image processing system 117 includes an image forming apparatus 101 and a host personal computer (PC) 119.

The image forming apparatus 101 is an example of an image processing apparatus according to the present exemplary embodiment and is, for example, a multi-function peripheral (MFP) that integrates a plurality of functions such as a scan function and a printer function. A control unit 110 controls the entire image forming apparatus 101, and includes a central processing unit (CPU) 105, a read-only memory (ROM) 106, a random-access memory (RAM) 107, a hard disk drive (HDD) 111, an operation unit interface (I/F) 112, a printer I/F 113, a scanner I/F 114, a network I/F 115.

The CPU 105 controls the operation of the image forming apparatus 101 by loading a program stored in the ROM 106 into the RAM 107 and executing the program. The RAM 107 is a temporary storage memory and is capable of temporarily storing image data, a program, and the like. The ROM 106 stores therein parameters for controlling the image forming apparatus 101, and an application, a program, and an operating system (OS) for implementing control according to an exemplary embodiment of the disclosure. The HDD 111 stores therein scanned image data and the like.

In addition, the CPU 105 controls an operation unit 118 via the operation unit I/F 112. Similarly, the CPU 105 controls an image output unit 109 via the printer I/F 113, and controls an image reading unit 108 via the scanner I/F 114. Furthermore, the CPU 105 controls reception of an image from the host PC 119 and transmission of an image to the host PC 119 via the network I/F 115 and a local area network (LAN) 116. The image reading unit 108 is, for example, a scanner. The image output unit 109 is, for example, a printer.

The CPU 105 loads a program stored in the ROM 106 into the RAM 107 and executes the program. This implements the scan function to acquire image data of a document read by the image reading unit 108, and an output function to output an image to a recording medium such as paper or a monitor via the image output unit 109.

Figure 2:
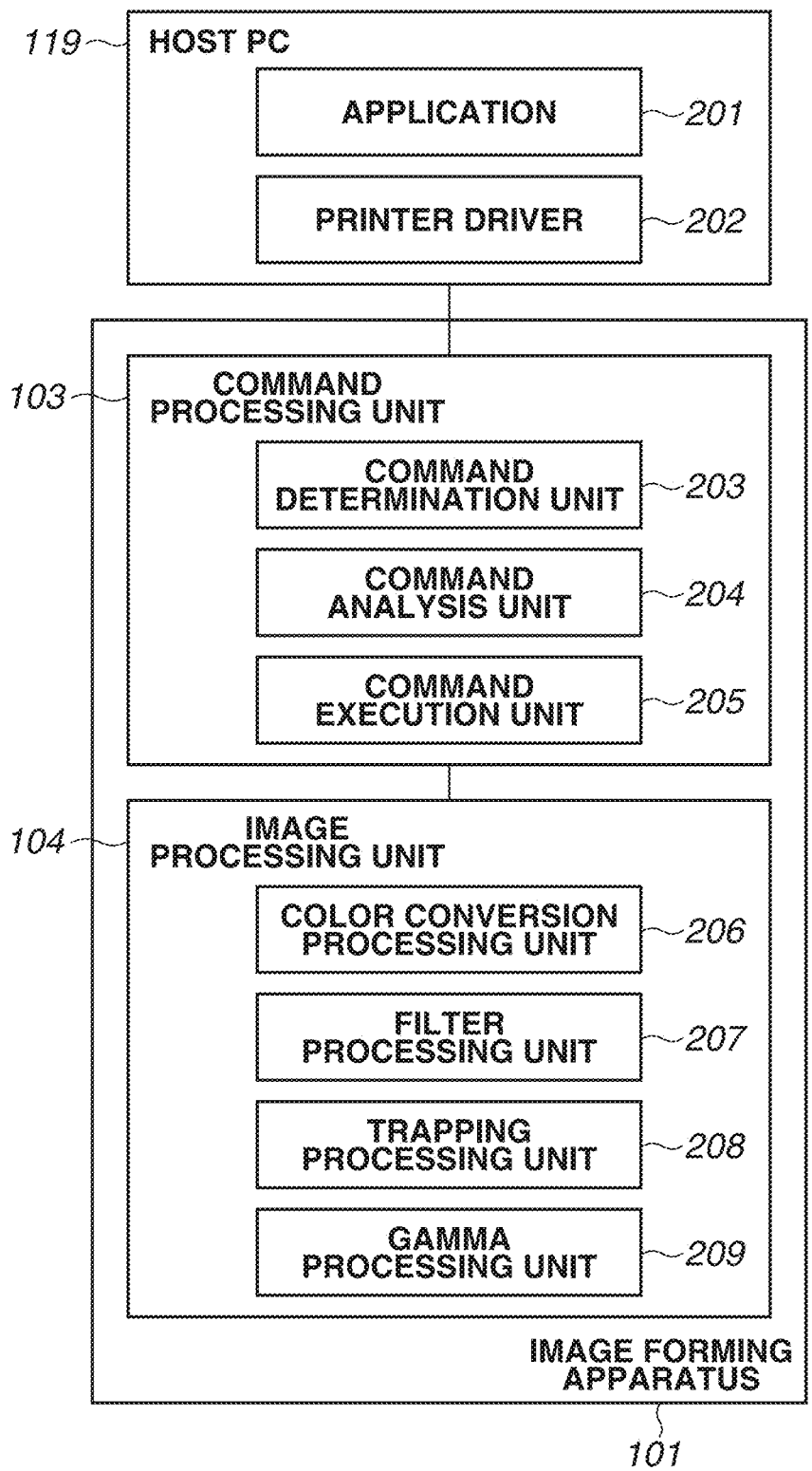
FIG. 2 is a block diagram illustrating an example of a processing configuration of the image processing system.

FIG. 2 is a block diagram illustrating an example of a software configuration of the image forming apparatus 101, which enables the print function to be operated from the host PC 119. The image forming apparatus 101 includes a command processing unit 103 and an image processing unit 104. Each of the function units is implemented by the CPU 105 of the image forming apparatus 101 executing a control program.

The command processing unit 103 determines, analyzes, and processes image data transmitted from a printer driver 202 (described below) of the host PC 119, so that a raster image and attribute information are generated and stored in the RAM 107. Each processing unit of the command processing unit 103 will be described below. The image processing unit 104 reads out the raster image and the attribute information stored in the RAM 107, and performs image processing for optimizing the raster image based on a parameter.

Each processing unit of the image processing unit 104 will be described below. The image processing unit 104 also performs image processing based on setting information provided from the operation unit 118. The image processing unit 104 further performs processing for converting a raster image represented in color to a raster image represented in gray (achromatic color). The operation unit 118 includes a touch panel and hardware keys, receives an instruction or a setting operation from a user, and also displays apparatus information regarding the image forming apparatus 101, job progress information, and various kinds of user interface screens. Setting information received by the operation unit 118 is stored in the RAM 107 via the control unit 110.

<Print Processing>

A processing configuration of the image processing system 117 illustrated in FIG. 2 will be described along a print processing procedure.

The host PC 119 illustrated in FIG. 2 generates electronic data such as a document and a presentation document using an application 201. The printer driver 202 outputs print data (color image data) to the image forming apparatus 101 and causes the image forming apparatus 101 to print the print data. The print data generated by the printer driver 202 is transmitted to the image forming apparatus 101.

Subsequently, the flow of the print data in the image forming apparatus 101 will be described with reference to a flowchart illustrated in FIG. 3. In addition, each processing performed by the CPU 105 loading a program stored in the ROM 106 into the RAM 107 and executing the program using the command processing unit 103 and the image processing unit 104 illustrated in FIG. 2 will be described.

First, in step S2501, the CPU 105 receives print data. At this time, the CPU 105 receives the print data via the network I/F 115 illustrated in FIG. 1.

Next, in step S2502, the CPU 105 analyzes the print data. At this time, the CPU 105 causes a command determination unit 203 in the command processing unit 103 illustrated in FIG. 2 to determine the type of page description language (PDL). The PDL type is, for example, PostScript (PS) or Printer Command Language (PCL). The CPU 105 then notifies a command analysis unit 204 of a result of the determination made by the command determination unit 203. The command analysis unit 204 is present for each PDL type, and extracts and analyzes a command of the PDL type determined by the command determination unit 203. The command analysis unit 204 performs red (R), green (G), and blue (B) data acquisition processing in steps S301 and discriminability determination processing in S302 of FIG. 7 (described below).

Subsequently, in step S2503, the command processing unit 103 performs raster image processor (RIP) processing.

In this processing, the CPU 105 causes a command execution unit 205 to perform drawing based on the result of the analysis performed by the command analysis unit 204 and to perform the RIP processing. This generates, for example, a raster image 407 and attribute information 415 illustrated in FIGS. 4B and 4C, respectively. The attribute information 415 indicates information regarding attributes.

In step S2504, the CPU 105 performs image processing. In step S2504, using the raster image and the attribute information generated by the command execution unit 205, the CPU 105 causes a color conversion processing unit 206 in the image processing unit 104 to perform color conversion processing from an RGB color space to a cyan (C), magenta (M), yellow (Y), and black (K) color space.

At this time, color conversion from the RGB color space to a different RGB color space may be performed. There-after, a filter processing unit 207 performs edge enhancement or other processing on the CMYK image or the RGB image. Edge enhancement processing will be described below. Image processing in each of steps S304 to S306 of FIG. 7 (described below) is also performed in step S2504.

Finally, in step S2505, the CPU 105 determines whether all pages of the received print data have been processed. If all the pages have not been processed (NO in step S2505), the processing returns to step S2502 and the CPU 105 repeats the processing in the step S2502 and the subsequent steps for the next page. If all the pages have been completed (YES in step S2505), the processing ends.

In the present exemplary embodiment, the command determination unit 203, the command analysis unit 204, and the command execution unit 205 that are included in the command processing unit 103, and the image processing unit 104, which are illustrated in FIG. 2, are implemented by the CPU 105 executing the above-described program. The above is the description of the command processing unit 103 and the image processing unit 104.

FIGS. 4A to 4C are diagrams illustrating an example in which the command analysis unit 204 analyzes a command and then the command execution unit 205 performs drawing and the RIP processing to generate a raster image and attribute information, which have been described with reference to FIG. 2. With reference to FIGS. 4A to 4C, the processing from when the command analysis unit 204 analyzes the command to when the command execution unit 205 performs drawing based on the result of the analysis by the command analysis unit 204 and generates the raster image and the attribute information via the RIP will be described.

The command includes a drawing command and a control command. Here, a drawing command 400 will be described as an example.

The drawing command 400 includes a color mode setting command 401 for setting the color mode of a job, and a color setting command 402 for setting a color. Furthermore, the drawing command 400 includes an object drawing command 403 for drawing an object, a text size setting command 404 for setting a text size, a font setting command 405 for setting a text font, and a text drawing command 406 for drawing text.

The configuration of these series of commands also applies to any other object or text string. Besides these commands, the drawing command 400 includes a command for setting coordinates, a command for setting a line thickness, and a command for drawing an image, but a description thereof will be omitted.

The content of the drawing command 400 will be briefly described. The following description about the drawing command 400 and color value data is based on the premise of an 8-bit image.

The color mode setting command 401 "Set Page Color (CL)" indicates that a color image is to be generated. The color setting command 402 "Set Color (95, 155, 213)" indicates that the RGB values are 95, 155, 213, respectively and represent blue.

The text size setting command 404 "Set Text Size (16)" indicates that the text size is 16 point. The font setting command 405 "Set Font (Arial)" indicates that the text font is Arial.

The object drawing command 403 "Draw Polygon" indicates that a graphic object is drawn based on a coordinate value (not illustrated). The text drawing command 406 "Draw Text ("x")" indicates that the text "x" is drawn. Thus, the third and fourth commands illustrated in FIG. 4A indicate that a rectangle is drawn in blue.

Similarly, the fifth to tenth commands indicate that the text string "ABC" is drawn in Arial, 16-point size, and orange. Furthermore, the eleventh to twentieth commands indicate that five objects are drawn in different colors.

Next, a raster image 407 (illustrated in FIG. 4B) and attribute information 415 (illustrated in FIG. 4C), which are generated by the command execution unit 205 performing drawing and the RIP processing based on the analysis of the drawing command 400 performed by the command analysis unit 204 will be described.

The blue rectangle image drawn by the third and fourth commands, which have been mentioned above in the description of the drawing command 400, corresponds to a color graphic object 408. The text string "ABC" drawn by the fifth to tenth commands corresponds to a text portion 409.

In addition, the eleventh to twentieth commands causes a circle graph including graphic objects 410 to 414 to be drawn and the RIP processing to be performed. As a result, the raster image 407, which is an 8-bit RGB three-channel image, is generated.

Color values of each object in the raster image 407 illustrated in FIG. 4B are as follows. The graphic object 408 has color values of (95, 155, 213) and the text portion 409 has color values of (237, 125, 49). The graphic objects 410 and 411 in the circle graph have color values of (237, 125, 49) and color values of (145, 145, 145), respectively. In addition, the graphic object 412 has color values of (255, 192, 0), the graphic object 413 has color values of (112, 173, 71), and the graphic object 414 has color values of (95, 155, 213).

Furthermore, the text portion 409 is generated from a text attribute 417, and the graphic object 408 is generated from a graphic attribute 416. The graphic objects 410 to 414 in the circle graph are also generated from the graphic attribute 416. The text attribute 417 and the graphic attribute 416 are included in the 8-bit single channel attribute information 415 indicating information regarding attributes.

In the attribute information 415 illustrated in FIG. 4C, the attribute information of the graphic portion is represented as (00100011), and the attribute information of the text portion is represented as (00100111), for example. The above is the description of the command analysis unit 204 and the command execution unit 205.

Figure 5:
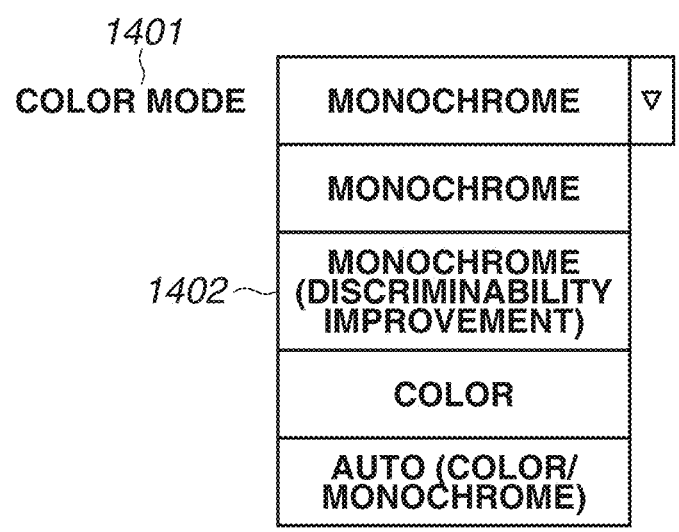
FIG. 5 is a diagram illustrating an example of a user interface (UI).
Figure 6:
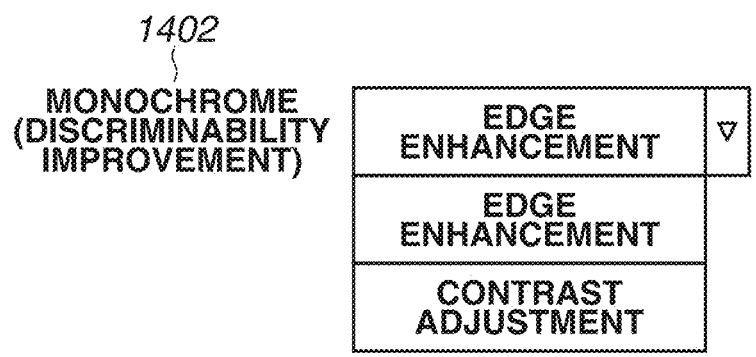
FIG. 6 is a diagram illustrating another example of the UI.

The description of the command analysis unit 204 and the command execution unit 205 generally applies to a case where the user selects color for the color mode setting. However, in discriminability improvement processing according to the present exemplary embodiment, processing similar to processing performed when color is selected is also performed when, as illustrated in FIG. 5 showing a part of the UI of the printer driver 202, "Monochrome (Discriminability Improvement)" 1402 is selected for a color mode setting 1401. Then, in the present exemplary embodiment, as illustrated in FIG. 6 showing a part of the UI of the printer driver 202, a discriminability improvement method can be selected by setting edge enhancement and grayscale conversion for the raster image 407.

Discriminability improvement processing 300 according to the present exemplary embodiment will be described next.

In the discriminability improvement processing 300, before the RIP processing, the drawing command 400 is analyzed first to acquire RGB values used in the document. Then, a determination is made of whether there are color objects that cannot be discriminated when the RGB values are weighted and converted to gray.

If colors difficult to discriminate are present, the attribute information of objects using the colors is corrected, rendering is performed on color data, and a color raster image and attribute information are output. Then, based on the color raster image and the attribute information, pixels to be subjected to edge enhancement or trapping processing are determined, and the edge enhancement or the trapping processing is performed on the color raster image. Finally, the color raster image is converted to a gray raster image. The edge enhancement processing and the trapping processing will be described below.

Details of the above-mentioned discriminability improvement processing 300 will be described with reference to FIG. 7.

The processing in this flowchart is implemented by the CPU 105 loading a program stored in the ROM 106 into the RAM 107 and executing the program using the command processing unit 103 and the image processing unit 104.

In the RGB data acquisition processing in step S301, the command processing unit 103 acquires RGB color values used in the document. In this processing, the command processing unit 103 causes the command analysis unit 204 to check the color setting command 402 and extract the color values designated in the color setting command 402.

Next, the command processing unit 103 adds the extracted RGB color values to a color value list 501 illustrated in FIG. 8A. The color value list 501 holds the extracted color values on a color-by-color basis (RGB, and gray). The command processing unit 103 calculates a weighted average of the RGB values to obtain a gray value and adds the gray value to the color value list 501. After completion of the color value list 501 for the raster image 407, the command processing unit 103 stores the color value list 501 in the RAM 107.

Next, in the discriminability determination processing in step S302, the command processing unit 103 determines the colors that are difficult to discriminate when converted to gray. In this processing, the command processing unit 103 determines the colors difficult to discriminate, based on the gray values in the color value list 501 stored in the RAM 107 by the command analysis unit 204. If the command processing unit 103 determines the colors difficult to discriminate, the command processing unit 103 corrects the attribute information of the objects having the colors. The details will be described below. A state where colors are difficult to discriminate is a state where the user can hardly discriminate colors when viewing the colors. The state where colors are difficult to discriminate is determined using a threshold.

Details of the discriminability determination processing in step S302 will be described with reference to a flowchart illustrated in FIG. 9. In step S901, the CPU 105 first reads, from the RAM 107, the color value list 501 illustrated in FIG. 8A, sorts the gray values in ascending order to create a color value list 502 (see FIG. 8B), and calculates differences between the gray values.

In the color value list 502 illustrated in FIG. 8B, the number of colors in the document is seven, but the graphic objects 408 and 414 have the same color, and the text portion 409 and the graphic object 410 have the same color. This means that the graphic objects 413, 408, 411, and 412 and the text portion 409 have different colors and thus there are four gray value differences.

Next, in step S902, the command processing unit 103 determines whether each of the gray value differences satisfies a predetermined condition. More specifically, the command processing unit 103 reads out a predetermined threshold from the RAM 107, and determines whether the gray value difference is smaller than the threshold. If the gray value difference is equal to or larger than the threshold (NO in step S902), the image processing unit 104 determines that the colors can be discriminated, and the processing ends. In contrast, if the gray value difference is smaller than the threshold (YES in step S902), the command processing unit 103 determines that the colors are difficult to discriminate, and the processing proceeds to step S903.

For example, in the color value list 502 of FIG. 8B, the difference between the gray value of the graphic object 413 and the gray value of the graphic object 408 is 1. In a case where the threshold is 16, the difference between the gray values is smaller than the threshold. Thus, the command processing unit 103 determines that the colors of the graphic objects 413 and 408 are difficult to discriminate.

Similarly, the command processing unit 103 performs this processing the number of times corresponding to the number of gray value differences. For example, in the example of the color value list 502 of FIG. 8B, the command processing unit 103 determines whether each of the gray value difference between the graphic objects 413 and 408, the gray value difference between the graphic objects 414 and 411, the gray value difference between the graphic object 411 and the text portion 409, the gray value difference between the graphic objects 410 and 412 is smaller than the threshold.

Finally, in step S903, the command processing unit 103 corrects the attribute information of the color objects to attribute information (including an enhancement attribute) indicating that discrimination processing is necessary. For example, as described above, the attribute information 415 of FIG. 4C indicates the graphic portion as (00100011). Bits are 0 to 7, and the bit 0 indicates 1, the bit 1 indicates 1, the bit 5 indicates 1, and the other bits indicate 0. In addition, the attribute information 415 indicates the text portion as (00100111).

Assuming that the bit 3 is used to determine whether the discrimination processing is necessary, the attribute information of the graphic portion requiring the discrimination processing is corrected to (00101011), and the attribute information of the text portion requiring the discrimination processing is corrected to (00101111).

Figure 10:
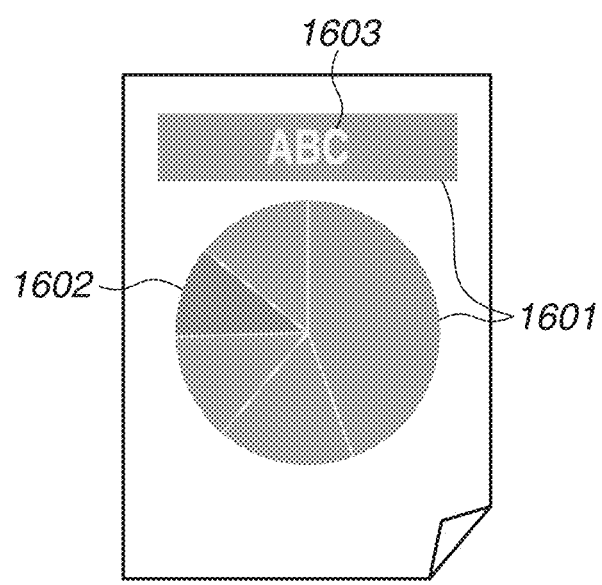
FIG. 10 is a diagram illustrating an example of drawn objects that require discrimination processing.

Accordingly, as illustrated in FIG. 10, attribute information of a graphic portion 1601 requiring the discrimination processing is represented as (00101011), and attribute information of a text portion 1603 requiring the discrimination processing is represented as (00101111). Attribute information of a graphic portion 1602 not requiring the discrimination processing is represented as (00100011).

In the example of the color value list 502 of FIG. 8B, if the threshold is 16, the colors of the graphic objects 413 and 408, the colors of the graphic objects 408 and 411, and the colors of the graphic object 411 and the text portion 409 each have a gray value difference smaller than 16. These colors are determined to be difficult to discriminate, and thus the attribute information of the objects are to be corrected.

The description returns to FIG. 3. In the RIP processing in step S2503, the command processing unit 103 causes the command execution unit 205 to generate a color raster image and attribute information from the PDL data.

In the color conversion processing in step S304, the image processing unit 104 performs the color conversion processing. In this processing, the image processing unit 104 converts RGB to RGB, but may convert RGB to CMYK.

In the edge enhancement processing in step S305, the image processing unit 104 performs the edge enhancement processing on the boundary between the objects that are difficult to discriminate. The edge enhancement processing is performed on each pixel using the color raster image and the attribute information.

Details of the edge enhancement processing in step S305 will be described with reference to a flowchart illustrated in FIG. 11.

The edge enhancement processing in step S305 is performed on each pixel in the raster image. The CPU 105 performs the processing of FIG. 11 on each pixel of interest in the raster image by referring to the attribute information at the position corresponding to the position of the pixel of interest.

First, in step S1001, the CPU 105 first determines whether the attribute information of the pixel of interest indicates that the discrimination processing is necessary. If the bit 3 of the attribute information at the position corresponding to the position of the pixel of interest indicates 1, the CPU 105 can determine that the discrimination processing is necessary. If the attribute information of the pixel of interest does not indicate that the discrimination processing is necessary (NO in step S1001), the processing ends. In contrast, if the attribute information of the pixel of interest indicates that the discrimination processing is necessary (YES in step S1001), the processing proceeds to step S1002.

Figure 9:
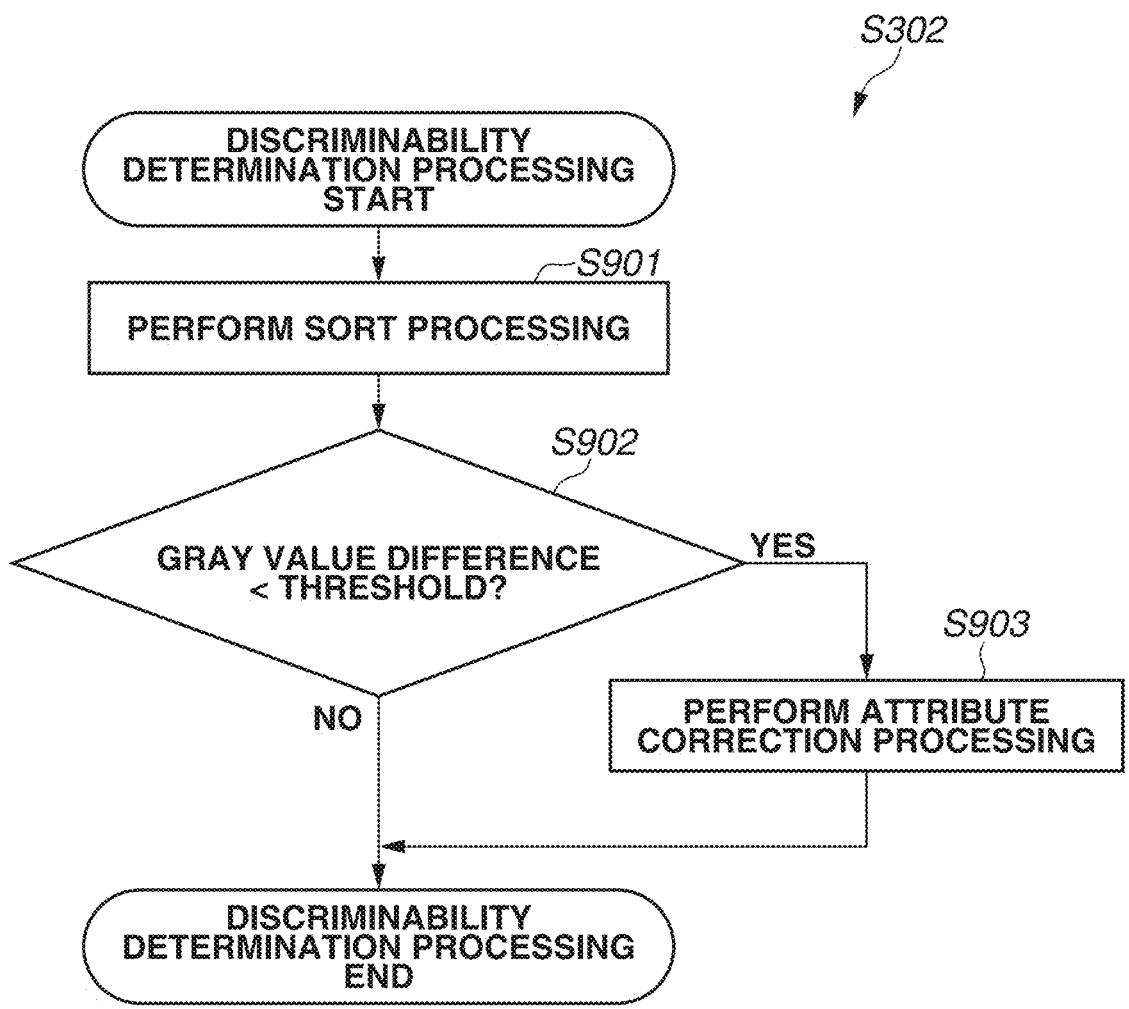
FIG. 9 is a flowchart illustrating processing performed in step S302 of FIG. 7.

Next, in step S1002, the CPU 105 determines whether the attribute information of a peripheral pixel around the pixel of interest is corrected in step S903 of FIG. 9 and indicates that the discrimination processing is necessary. Similarly to step S1001, if the bit 3 of the attribute information at the position corresponding to the position of the peripheral pixel indicates 1, the CPU 105 can determine that the discrimination processing is necessary. The peripheral pixel is, for example, a pixel adjacent to the pixel of interest (an adjacent pixel).

If the attribute information of the peripheral pixel does not indicate that the discrimination processing is necessary (NO in step S1002), the processing ends. In contrast, if the attribute information of the peripheral pixel indicates that the discrimination processing is necessary (YES in step S1002), the processing proceeds to step S1003.

In step S1003, the CPU 105 determines whether the pixel of interest and the peripheral pixel have different colors. At this time, the CPU 105 can determine whether the pixel of interest and the peripheral pixel have the same color by comparing the color information of the pixel of interest and the color information of the peripheral pixel. If the pixel of interest and the peripheral pixel have the same color (NO in step S1003), the processing ends. In contrast, if the pixel of interest and the peripheral pixel have different colors (YES in step S1003), the processing proceeds to step S1004.

Figure 12:
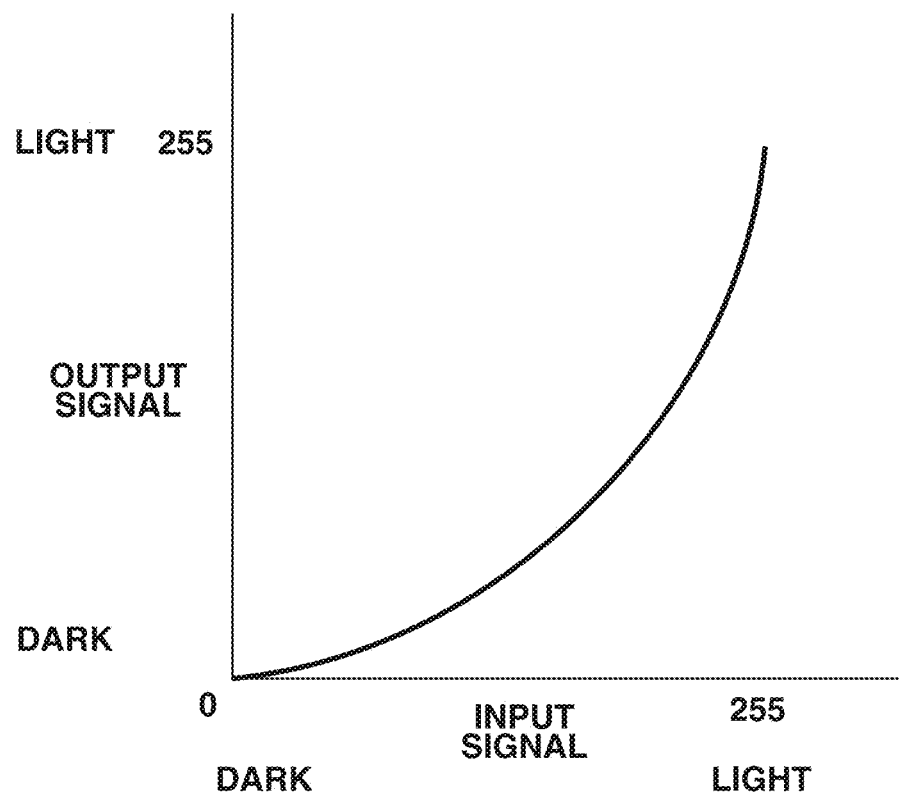
FIG. 12 is a diagram illustrating an example of a one-dimensional look-up table (LUT).
Figure 13:
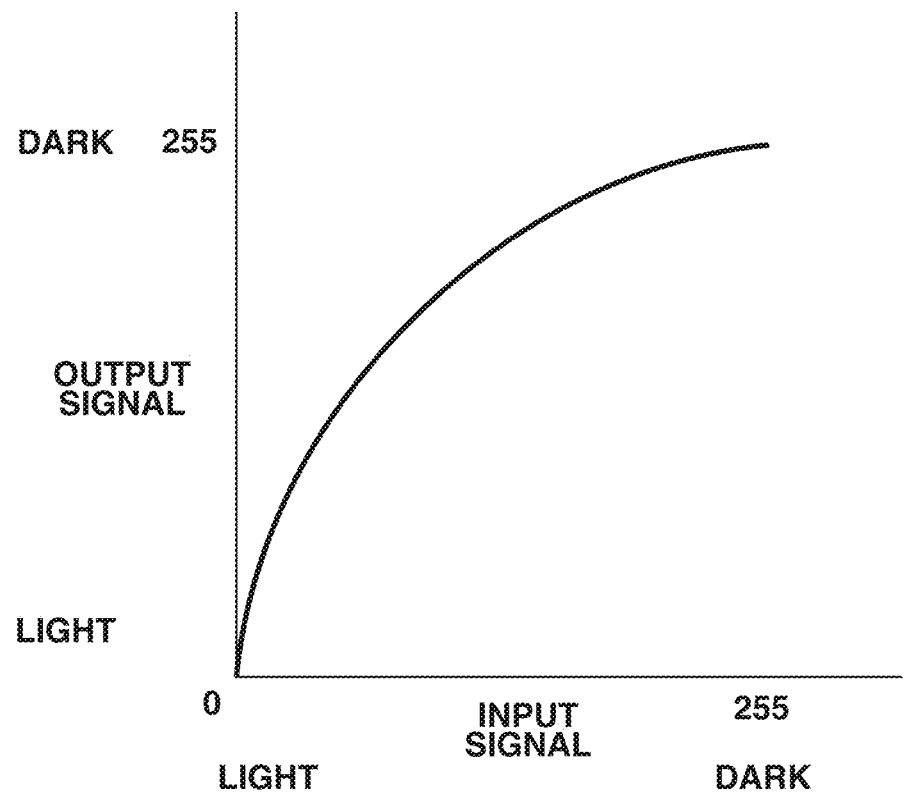
FIG. 13 is a diagram illustrating another example of the one-dimensional LUT.
Figure 14:
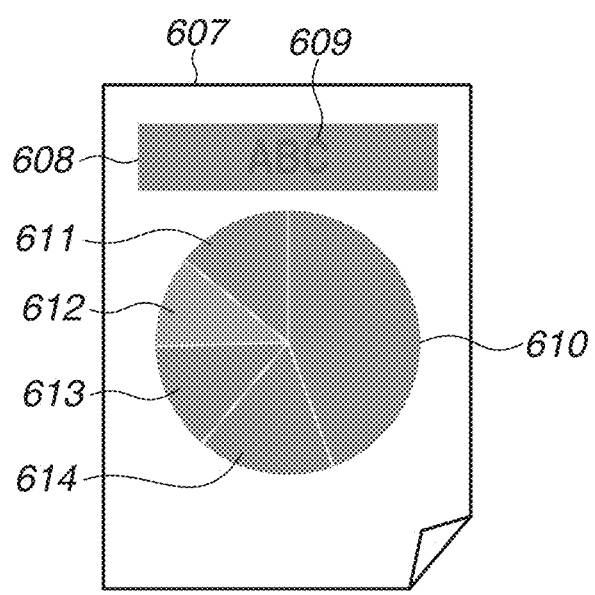
FIG. 14 is a diagram illustrating another example of the drawn objects that require the discrimination processing.

Finally, in step S1004, the CPU 105 performs processing for enhancing the pixel value of the pixel of interest. For example, in a case where input image data is RGB data, the CPU 105 applies, to the pixel value, a one-dimensional look-up table (LUT) having a downward convex curve as illustrated in FIG. 12 so that an output value represents a darker color than the input value. Here, an input signal indicates one of RGB planes and the same LUT is applied to each of the input signals. In a case where the input image data to be subjected to the edge enhancement processing in step S305 is CMYK data, the CPU 105 uses a one-dimensional LUT having an upward convex curve as illustrated in FIG. 13 so that the output value represents a darker color than the input value. The above is the description of the edge enhancement processing in step S305.

Figure 7:
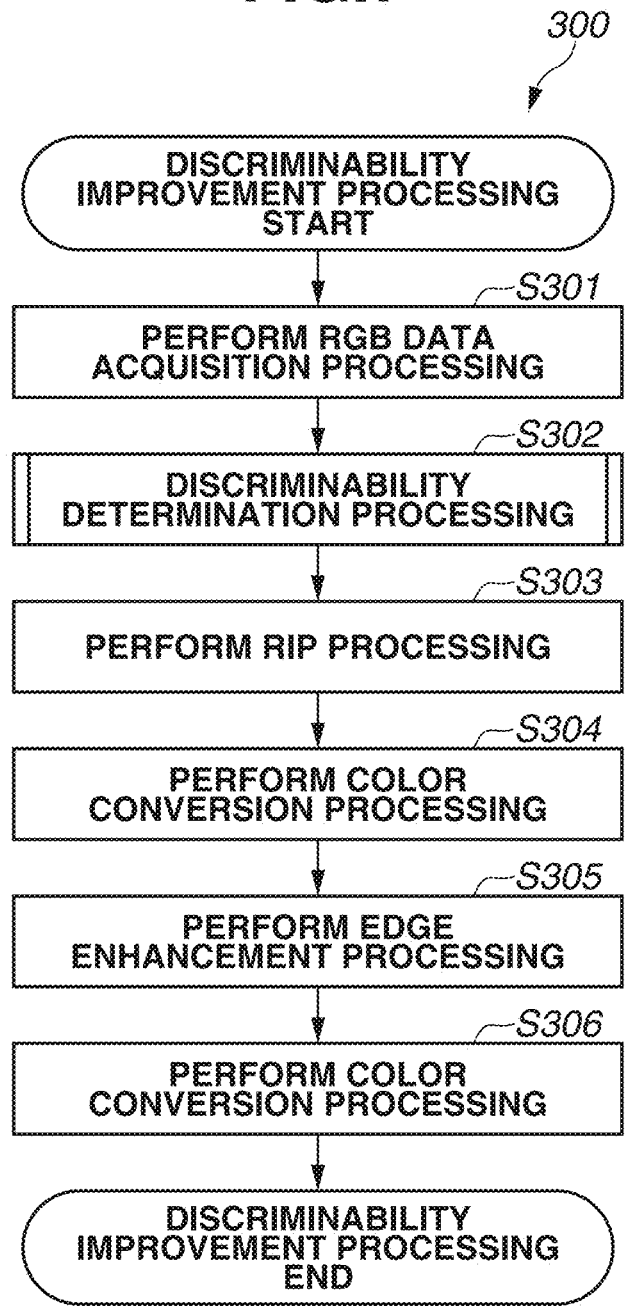
FIG. 7 is a flowchart illustrating an example of discriminability improvement processing.

The description returns to FIG. 7. In the color conversion processing in step S306, the CPU 105 causes the image processing unit 104 to perform color-to-gray conversion on a pixel-by-pixel basis. In this processing, in a case where the input image to be subjected to the color conversion processing in step S306 is an RGB image, the CPU 105 calculates a weighted average of the RGB values as a gray value, inverts the gray value to obtain a density signal, and transmits the density signal to the image output unit 109. In a case where the input image to be subjected to the color conversion processing in step S306 is a CMYK image, the CPU 105 converts CMYK to K and transmits the K image to the image output unit 109.

The above is the description of the procedure of the discriminability improvement processing 300 according to the present exemplary embodiment.

Effects of the discriminability improvement processing 300 will be described with reference to FIGS. 4A to 4C and FIGS. 14 to 17.

First, a conventional configuration will be described. In a case where the edge enhancement processing in step S305 is not performed, the conversion of the color raster image 407 of FIG. 4B to a gray raster image changes the color raster image 407 to an image like an image 607 illustrated in FIG. 14. In the image 607, a title bar 608 and a text string 609 have approximately same gray values and are difficult to discriminate. In addition, objects 610, 611, 613, and 614 in a circle graph have approximately same gray values and are difficult to discriminate due to the disappearance of boundaries between the objects.

Figure 15:
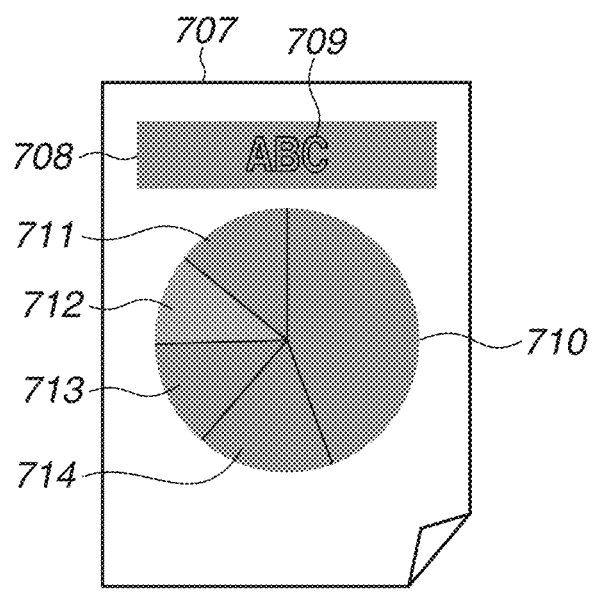
FIG. 15 is a diagram illustrating an example of an image subjected to enhancement processing.

On the other hand, in the present exemplary embodiment, the discriminability improvement processing 300 is performed on the color raster image 407, so that the boundaries between the objects are enhanced and the color raster image 407 is changed to an image like an image 707 illustrated in FIG. 15. Accordingly, the discriminability of colors is improved.

Figure 16:
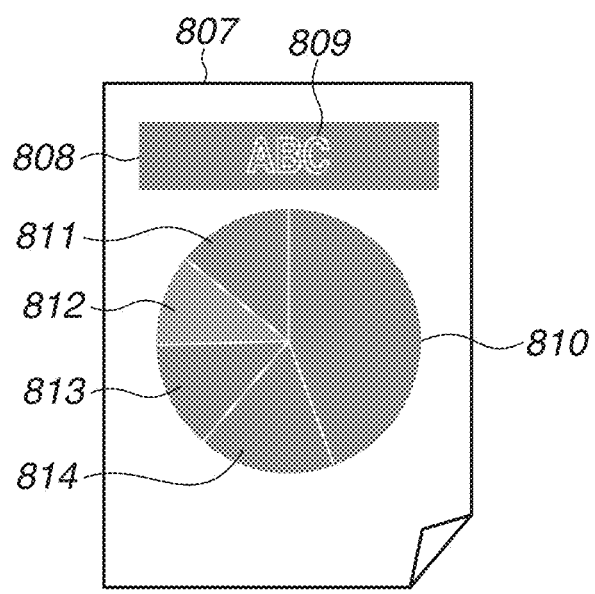
FIG. 16 is a diagram illustrating another example of the image subjected to enhancement processing.

Performing the discriminability improvement processing 300 can prevent deterioration of the discriminability when converting a color image to a gray image. In the present exemplary embodiment, in the edge enhancement processing in step S305, a one-dimensional LUT is applied to a pixel value of an edge portion to be enhanced so that the output value represents a darker color, but the processing is not limited thereto. For example, a one-dimensional LUT may be applied to the pixel value so that the output value represents a lighter color as illustrated in FIG. 16 to improve the discrimination between the objects. The discrimination may be improved by not only using the one-dimensional LUT, but also performing sharpness processing using the filter processing unit 207 of the image processing unit 104 or performing trapping processing using a trapping processing unit 208 of the image processing unit 104.

Figure 17:
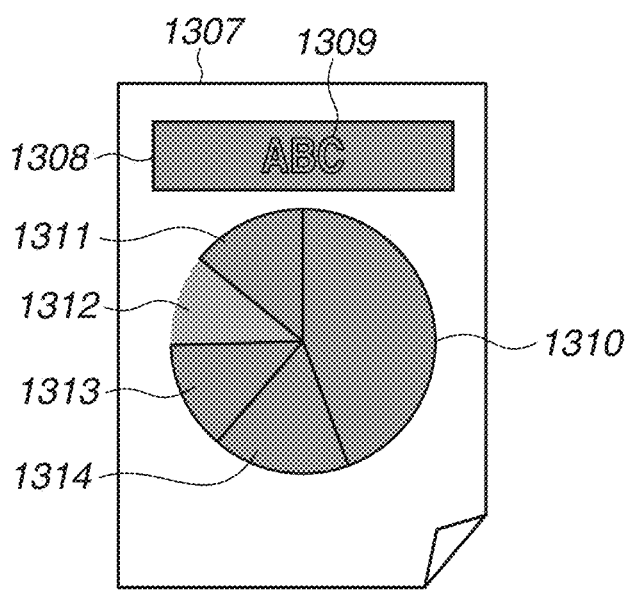
FIG. 17 is a diagram illustrating yet another example of the image subjected to enhancement processing.

In the case of using the sharpness processing, the enhancement processing is performed so that the outer edge of the object to be discriminated is bordered as illustrated in FIG. 17. In the case of not performing attribute determination processing on a reference pixel in step S1002, edge enhancement is to be performed on a border between the object to be discriminated and any object having a different color from that of the object.

An example of the sharpness processing performed by the filter processing unit 207 will be described with reference to FIGS. 18A to 18E. Among RGB data, R color plane data will be described as an example.

Figure 18A:
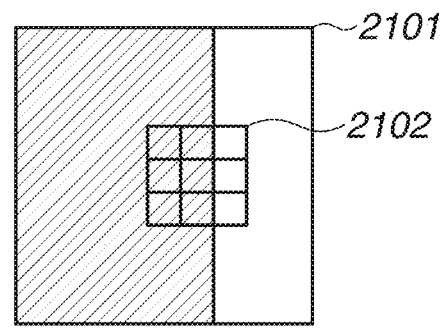
Figure 18B:
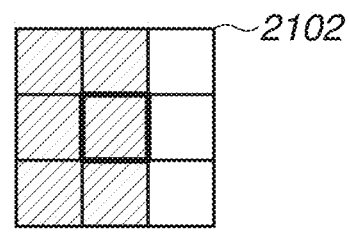

In an image 2101 illustrated in FIG. 18A, a hatched portion indicates that an R signal value is 200, and a white portion indicates that an R signal value is 255. An edge portion 2102 including 3×3 pixels in the image 2101 is illustrated in an enlarged manner in FIG. 18B. FIG. 18B indicates that a center pixel in the edge portion 2102 is to be subjected to the image processing in the present exemplary embodiment. FIG. 18C illustrates weights to be applied to the respective 3×3 pixels in the edge portion 2102.

Calculation in the sharpness processing will be described next. In the sharpness processing, the signal value of the center pixel is calculated by multiplying the signal values of the 3×3 pixels in the edge portion 2102 of FIG. 18B by the respective weights indicated in FIG. 18C and then adding the values. The calculation is thus performed using the following Formula (1).

$$\text{(the signal value of the center pixel)} = 200 \times 0 + 200 \times (-1) + 255 \times 0 + 200 \times (-1) + 200 \times 5 + 255 \times (-1) + 200 \times 0 + 200 \times (-1) + 255 \times 0 = 145 \quad (1)$$

Figure 18D:
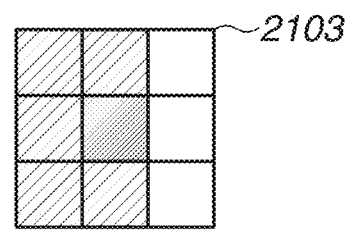
Figure 18E:
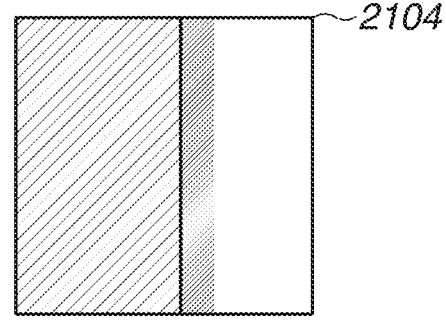

When the signal value of the center pixel is 145, as indicated by an image 2103 illustrated in FIG. 18D, the center pixel is darker than the center pixel before the sharpness processing illustrated in the edge portion 2102 of FIG. 18A. Performing this processing on the entire image changes the image 2101 of FIG. 18A to an image having a darker edge portion as indicated by an image 2104 illustrated in FIG. 18E.

While the description has been given of the R color plane, similar processing can be performed on G and B color planes and also on another color space such as CMYK data.

The above is the description of the sharpness processing.

Next, an example of the trapping processing performed by the trapping processing unit 208 will be described similarly with reference to FIGS. 19A to 19E. Here, the trapping processing is performed after RGB data is converted to CMYK data because it is common that trapping processing is performed after conversion of data to CMYK data. A case where C and M color planes are adjacent to each other among CMYK planes will be described.

In an image 2201 illustrated in FIG. 19A, a hatched portion indicates that a C pixel value is 128, and a dotted portion indicates that an M pixel value is 128. An edge portion 2202 including 3×3 pixels in the image 2201 is illustrated in an enlarged manner in FIG. 19B. In this example, a center pixel in the edge portion 2202 is to be subjected to the image processing. In addition to the enlarged edge portion 2202, FIG. 19B illustrates an enlarged edge portion 2202_1 indicating the C plane, and an enlarged edge portion 22022 indicating the M plane. An edge portion 2203 illustrated in FIG. 19C indicates weights to be applied in the trapping processing.

In the trapping processing, a color plane that is not present in the pixel of interest is acquired from the periphery of the pixel of interest. Thus, in a case where the C plane is present in the pixel of interest like this example, a pixel of the C plane is not acquired from the periphery of the pixel of interest in the trapping processing.

Since the M plane is not present in the pixel of interest, a pixel of the M plane is acquired from the periphery of the pixel of interest in the trapping processing. A calculation method for acquiring the pixel of the M plane from the periphery in the trapping processing is as follows. The M pixel value of the center pixel is calculated by multiplying the pixel values of the M plane illustrated in the edge portion 2202_2 by the respective weights illustrated in the edge portion 2203. The M pixel value of the center pixel is thus calculated by the following Formula (2).

$$\text{(the } M \text{ pixel value of the center pixel)} = 128 \times 100\% = 128 \quad (2)$$

When the C plane in the edge portion 2202_1 is combined, the pixel value of the center pixel is CMYK (128, 128, 0, 0) and the resultant image is like an image 2204 illustrated in FIG. 19D.

Performing this processing on the entire image changes the image 2201 to an image like an image 2205 in which the C and M planes overlap each other in the boundary portion between the C and M planes. Then, to perform color conversion of CMYK data to K data, the relation of C+M+Y+K=K' is to be satisfied. Pixel values of the C plane portion other than the boundary portion between the C and M planes are converted from CMYK (128, 0, 0, 0) to K' (128). Pixel values of the boundary portion between the C and M planes are converted from CMYK (128, 128, 0, 0) to K' (256).

In other words, the boundary portion between the C and M planes has a darker color. The above is the description of the trapping processing.

With the configuration according to the present exemplary embodiment, when color reduction processing is performed to convert a color image to a gray image, the attribute information of colors that are originally different but become similar and difficult to discriminate after gray conversion is corrected and the corrected attribute information is referred, so that edge enhancement can be performed on the boundary portion between the colors. Therefore, the discriminability of the colors in the boundary portion can be improved.

In the first exemplary embodiment, the discriminability of colors is improved by correcting the attribute information of the colors determined to be difficult to discriminate and by performing the edge enhancement on the portion corresponding to the corrected information. In a second exemplary embodiment, a method in which the edge enhancement processing is performed on a boundary portion between adjacent colors that are difficult to discriminate by changing color conversion processing and edge enhancement processing instead of correcting the attribute information will be described with reference to FIG. 20. Processing similar to that in the first exemplary embodiment will be simply described.

Discriminability improvement processing 1800 will be described with reference to FIG. 20.

In step S1801, the color values used in the document are acquired similarly to step S301 of FIG. 7 described above.

In step S1802, the discriminability determination processing is performed. In FIG. 9 according to the first exemplary embodiment, the attribute information is corrected in step S903 based on the determination made in step S902 of whether the colors can be discriminated. In the present exemplary embodiment, color conversion processing is changed based on the determination of whether the colors can be discriminated.

The details will be described with reference to FIG. 21.

First, in step S1901, the CPU 105 performs processing similar to the processing in step S901 of FIG. 9 described in the first exemplary embodiment. Next, in step S1902, the CPU 105 reads out a predetermined threshold from the RAM 107 and determines whether the gray value difference is equal to or larger than the threshold. If the gray value difference is equal to or larger than the threshold (NO in step S1902), the CPU 105 determines that the colors can be discriminated, and the processing proceeds to step S1903 to perform color conversion processing 1-1. If the gray value difference is smaller than the threshold (YES in step S1902), the CPU 105 determines that the colors are difficult to discriminate, and the processing proceeds to step S1904 to perform color conversion processing 1-2.

In the color conversion processing 1-1, processing for converting RGB to R'G'B' is performed. The conversion is performed so that all the RGB signal values become the same signal value. For example, the CPU 105 assigns, to the RGB signal values, the gray value obtained by the method of calculating a weighted average of the RGB values as a gray value, i.e., RGB is converted to R'G'B' (Gray, Gray, Gray).

On the other hand, in the color conversion processing 1-2, processing for converting RGB to R"G"B" is performed so that all the RGB signal values do not become the same signal value.

The description returns to FIG. 20. In step S1803, the RIP processing in step S303 of FIG. 7 described in the first exemplary embodiment is performed. In step S1804, color conversion processing 2 is performed. In the color conversion processing 2, color conversion from the RGB color space to the CMYK space is performed. In this processing, the R'G'B' values obtained when determining that the colors can be discriminated are converted to color values representing the K plane such as CMYK (0, 0, 0, K), while the R"G"B" values obtained when determining that the colors are difficult to discriminate are converted to color values representing the color planes other than the K plane such as CMYK (C, M, Y, 0).

In this example, R'G'B' is (Gray, Gray, Gray), and the conversion from R'G'B' (Gray, Gray, Gray) to CMYK (0, 0, 0, K) is performed by inverting the gray value to obtain a value of K, i.e., K=255−Gray.

On the other hand, the conversion of R"G"B" to CMYK (C, M, Y, 0) is performed by inverting the gray value to obtain a value of C+M+Y, i.e., C+M+Y=255−Gray.

In step S1805, the edge enhancement is performed. At this time, the edge enhancement is performed on each of the CMY color planes. The image processing unit 104 performs the edge enhancement on the CMY planes and not on the K plane.

With the processing described above, the colors determined to have a gray value difference equal to or larger than the predetermined threshold in step S1902 are converted to the K plane by the color conversion processing 1-1 and the color conversion processing 2, and is not to be subjected to the edge enhancement. On the other hand, the colors determined to have a gray value difference smaller than the predetermined threshold in step S1902 are converted to the CMY color planes by the color conversion processing 1-2 and the color conversion processing 2, and is to be subjected to the edge enhancement.

In step S1806, color conversion from CMYK to K is performed. At this time, for example, CMYK is converted to K (C+M+Y+K). This increases the value of the portion subjected to the edge enhancement in step S1805, and results in the portion being output in darker gray.

The colors determined to be discriminable and included in the portion not subjected to the edge enhancement are converted to CMYK (0, 0, 0, K) in the color conversion processing 2 in step S1804. Here, the value of K is an inverted value of Gray, which is the same as the inverted value of the gray value obtained by calculating a weighted average of the RGB values. In the processing in step S1806, CMYK (0, 0, 0, K) is converted to K (C+M+Y+K), i.e., K (255−Gray), which is the same as the inverted value of the gray value obtained by calculating a weighted average of the RGB values.

On the other hand, the colors determined not to be discriminable are converted to CMYK (C, M, Y, 0) so that C+M+Y=255−Gray in the color conversion processing 2 in step S1804. Thus, in the processing in step S1806, CMYK (C, M, Y, 0) is converted to K (C+M+Y+K), i.e., K (255−Gray), which is the same as the inverted value of the gray value obtained by calculating a weighted average of the RGB values.

The discriminability improvement processing can be performed also with the configuration according to the present exemplary embodiment, by changing the color conversion processing and the edge enhancement processing without using the attribute information.

Instead of performing the color conversion processing 1-1 in step S1903 and the color conversion processing 1-2 in step S1904, similar processing may be performed in the color conversion processing 2 in step S1804.

In this case, in the color conversion processing 2 in step S1804, if the gray value difference is equal to or larger than the predetermined threshold based on the result of the determination made in step S1902, the CPU 105 performs color conversion from RGB to K. If the gray value difference is smaller than the predetermined threshold, the CPU 105 performs color conversion from RGB to CMY.

Alternatively, in the color conversion processing 2 in step S1804, if the gray value difference is equal to or larger than the predetermined threshold based on the result of the determination made in step S1902, the CPU 105 may perform color conversion from RGB to C. If the gray value difference is smaller than the predetermined threshold, the CPU 105 may perform color conversion from RGB to MYK. In this case, in the edge enhancement processing in step S1805, the edge enhancement is performed on the MYK planes, not on the C plane, so that the same result can be obtained.

While there are several types of edge enhancement methods as described above, a case where the trapping processing is used as the edge enhancement method will be described in a third exemplary embodiment.

As described in the first exemplary embodiment, the trapping processing provides the effects of edge enhancement by overlapping adjacent different color planes. However, there is a case where the trapping processing is not to be performed depending on adjacent colors.

For example, in a case where a color of CMYK (100, 50, 0, 0) and a color of CMYK (50, 100, 0, 0) are adjacent to each other, both the adjacent colors are composed of the C and M planes, which does not cause a white void. In such a case, the trapping processing is not to be performed and thus the discriminability improvement processing is not to be performed.

To solve the issue, CMYK (100, 50, 0, 0) is converted to CMYK (100, 0, 0, 0) and CMYK (50, 100, 0, 0) is converted to CMYK (0, 100, 0, 0) in advance. Performing color conversion in this way allows one of the adjacent colors to have the C place and the other to have the M plane, which causes a white void. Accordingly, the trapping processing is to be performed and the discriminability improvement processing is to be performed.

Figure 22:
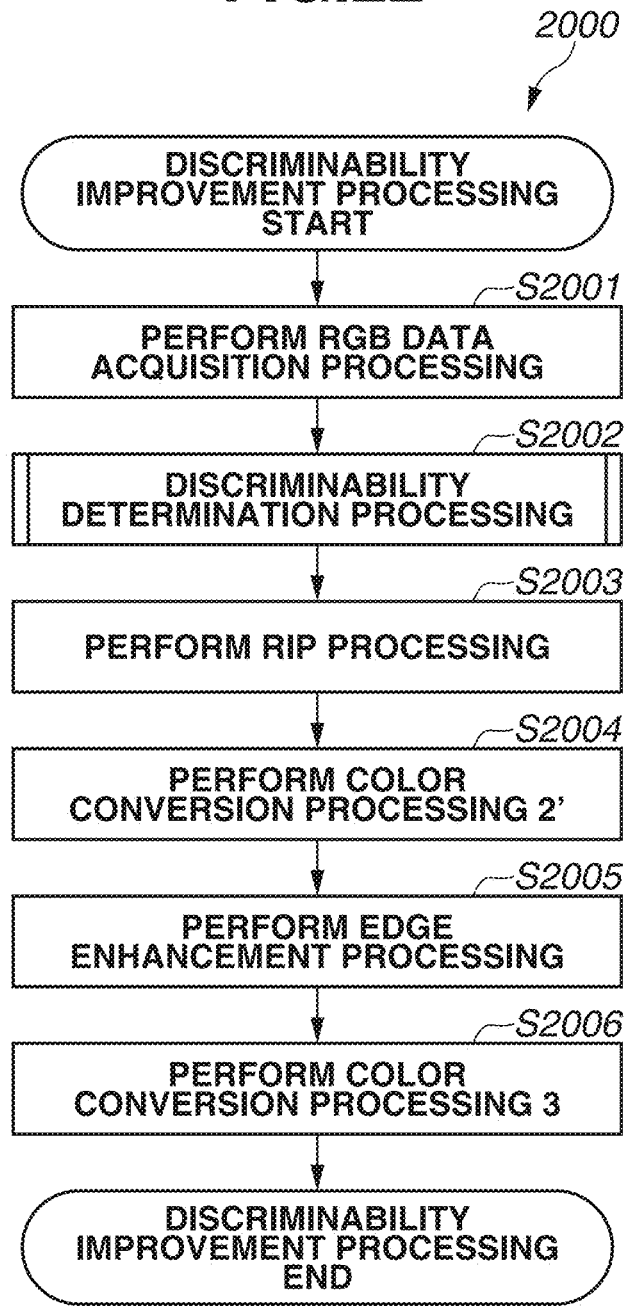
FIG. 22 is a flowchart illustrating yet another example of the discriminability improvement processing.

As described above, in the present exemplary embodiment, an example of solving the issue by intentionally changing the color plane configuration to perform color conversion so that the trapping processing is performed will be described with reference to FIG. 22. A description of processing similar to that in the second exemplary embodiment will be omitted.

In step S2001, the color values used in the document are acquired, similarly to step S1801 of FIG. 20 described in the second exemplary embodiment.

In step S2002, the discriminability improvement processing is performed. The processing will be described with reference to FIG. 23.

Figure 21:
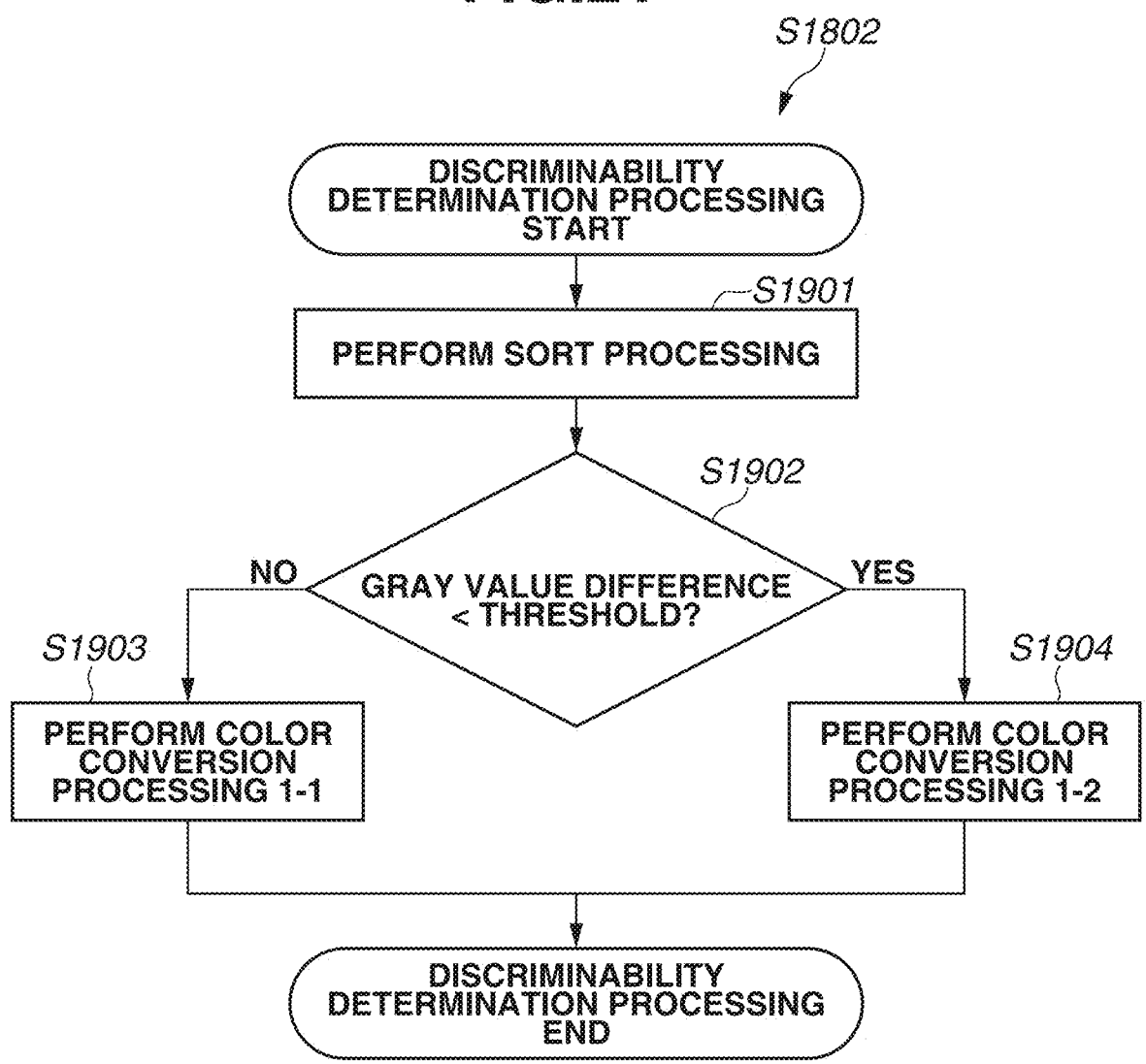
FIG. 21 is a flowchart illustrating processing performed in step S1802 of FIG. 20.

First, in step S2301, the CPU 105 performs processing similar to the processing in step S1901 of FIG. 21 described in the second exemplary embodiment. Next, in step S2302, the CPU 105 performs processing similar to the processing in step S1902 of FIG. 21 described in the second exemplary embodiment. In this case, if the gray value difference is equal to or larger than the predetermined threshold (NO in step S2302), the CPU 105 determines that the colors can be discriminated, and the processing proceeds to step S2303 to perform the color conversion processing 1-1, which is the same as the processing in step S1903. If the gray value difference is smaller than the predetermined threshold (YES in step S2302), the CPU 105 determines that the colors are difficult to discriminate, and the processing proceeds to step S2304 to perform color conversion processing 1-3.

In the color conversion processing 1-1 according to the third exemplary embodiment, RGB is converted to R'G'B' so that all the RGB signal values become the same signal value, similarly to the processing in step S1903 of FIG. 21.

On the other hand, in the color conversion processing 1-3, RGB is converted to R"G"B" so that two of the RGB channels have a signal value of 255.

For example, RGB is converted to R"G"B" (R, 255, 255).

In step S2003, the CPU 105 performs the RIP processing in step S303 of FIG. 7 described in the first exemplary embodiment. In step S2004, the CPU 105 performs color conversion processing 2'. When performing the color conversion processing from the RGB space to the CMYK space, the CPU 105 converts the R'G'B' values to a color value of the K plane such as CMYK (0, 0, 0, K), similarly to the second exemplary embodiment. On the other hand, the CPU 105 converts the R"G"B" values so that at least one of the CMY planes has a color value of 0. For example, the CPU 105 converts the current configuration to a configuration having the C plane such as CMYK (C, 0, 0, 0), in which the color values of the color planes other than the C plane are 0.

In order for the trapping processing to be performed, the CPU 105 performs the conversion so that the colors difficult to discriminate have different configurations from each other, such as a configuration having the C plane, a configuration having the M plane, a configuration having the Y plane, and a configuration having the C and M planes. A method for performing color conversion to two color planes is as follows. For example, when the current configuration is converted to the configuration having the C and M planes, RGB is converted to R"G"B" (R, G, 255) in the color conversion processing 1-3 in step S2304. Then, the color conversion processing 2' in step S2004 is implemented by converting (R, G, 255) to (C, M, 0, 0).

In step S2005, the edge enhancement is performed. Similarly to the second exemplary embodiment, the colors that can be discriminated are converted to a monochrome color of the black plane and the trapping processing is not to be performed on the K plane. On the other hand, because the colors difficult to discriminate are converted to have different plane configurations, the trapping processing is to be performed on the colors.

In step S2006, the CPU 105 performs color conversion from CMYK to K. In this processing, the conversion is performed, for example, from CMYK to (C+M+Y+K). This makes the color monochrome, and also increases the value of the color if subjected to the edge enhancement in step S2005, thereby producing an output having darker gray.

In this manner, the discriminability improvement processing can be performed by changing the color conversion processing and the edge enhancement processing without using the attribute information when performing the trapping processing.

Figure 23:
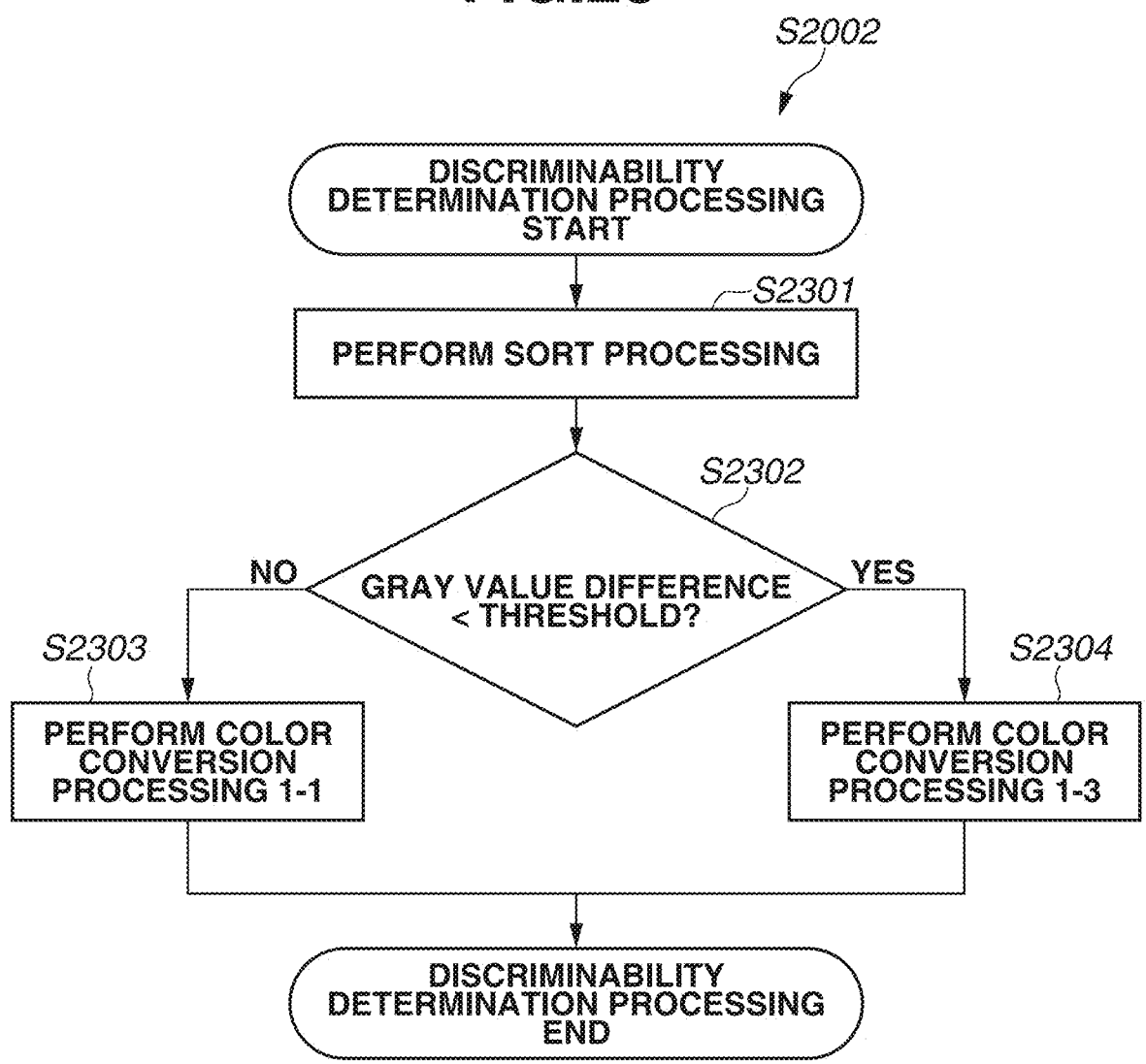
FIG. 23 is a flowchart illustrating processing performed in step S2002 of FIG. 22.

In the color conversion processing 1-3 in step S2304 of FIG. 23 according to the present exemplary embodiment, RGB is converted to R"G"B" so that two of the RGB channels have a signal value of 255. At this time, because the RGB values are changed from the original values, the gray value may be changed from the value before the discrimination processing.

To solve this, when converting RGB to R"G"B" in the color conversion processing 1-3, the CPU 105 calculates the gray value in advance, and sets RGB to (Gray, 255, 255). Then, in the color conversion processing 2', the CPU 105 performs color conversion from R'G'B' to CMYK so that CMYK is (Gray, 0, 0, 0). Accordingly, in the color conversion processing 3, (Gray, 0, 0, 0) is converted to (C+M+Y+K)=(Gray) and the gray value can be stored.

In the first to third exemplary embodiments, the CPU 105 performs the RIP processing on the color data in step S303, performs the edge enhancement processing on the color raster image in step S305, and then performs the color conversion processing on the color raster image in step S306, so that the color raster image is converted to the gray raster image. This method, however, requires handling of color data and thus increases the size of the memory and hardware configuration, which causes a cost increase. Thus, in a fourth exemplary embodiment, the attribute correction processing (processing in step S903) performed in the discrimination determination processing in step S302 is modified to reduce the size of the memory and hardware configuration.

A description of a configuration similar to that according to the first exemplary embodiment will be omitted. The configuration according to the present exemplary embodiment is also implemented by the CPU 105 loading a program stored in the ROM 106 into the RAM 107 and executing the program using the command processing unit 103 and the image processing unit 104.

Figure 24:
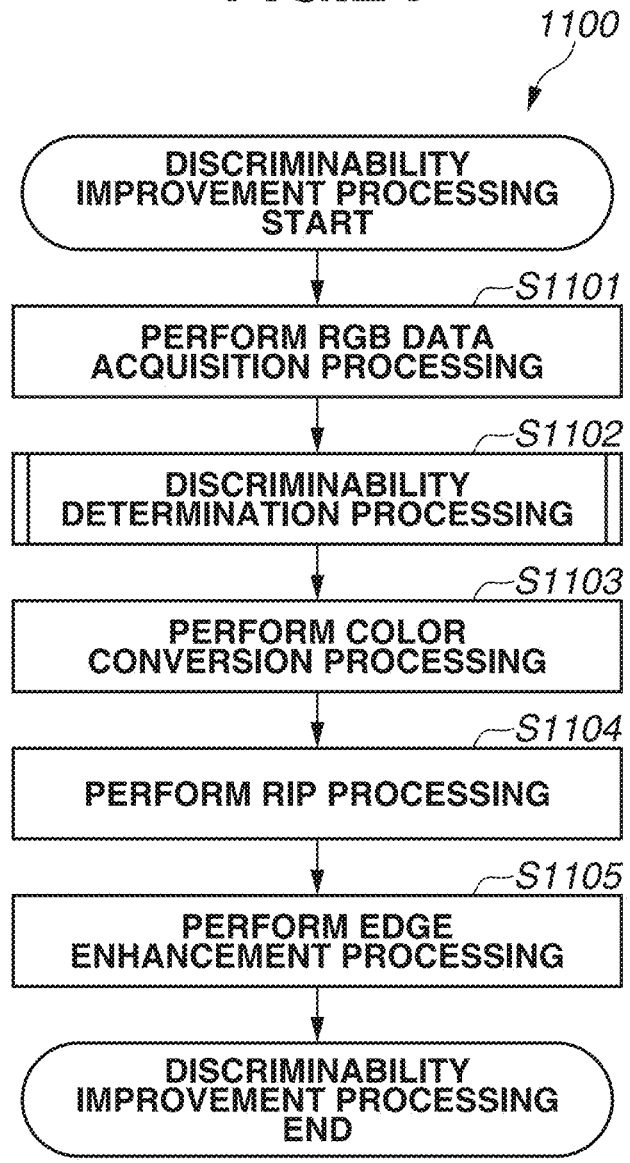
FIG. 24 is a flowchart illustrating yet another example of the discriminability improvement processing.

Discriminability improvement processing 1100 according to the fourth exemplary embodiment will be described with reference to FIG. 24.

First, in the RGB data acquisition processing in step S1101, the color values used in the document are acquired. This processing is similar to that performed in step S301 of FIG. 7.

Next, in step S1102, the discrimination determination processing is performed. This processing is similar to that performed in step S302 of FIG. 7, but is different in the attribute correction processing in step S903, and thus the attribute correction processing will be described. In step S1102, the CPU 105 causes the command analysis unit 204 to give, in the attribute correction processing, numbers to the colors included in the color value list 502 of FIG. 8B and having a gray value difference smaller than the predetermined threshold.

Taking the color value list 502 of FIG. 8B as an example, the colors of the graphics 413, 408, . . . , and 410 cause a gray value difference smaller than the predetermined threshold and are difficult to discriminate. Thus, the command analysis unit 204 gives "0" to the graphic object 413, "1" to the graphic object 408, . . . , and "5" to the graphic object 410. The command analysis unit 204 adds these numbers to the bits 4, 6, and 7 of the attribute information. Accordingly, the attribute information of the graphic object 413 is represented as (00101011)=(43), the attribute information of the graphic object 408 is represented as (00111011)=(59), and the attribute information of the graphic object 414, which has the same color as that of the graphic object 408, is represented as (00111011)=(59). In addition, the attribute information of the graphic object 411 is represented as (10111011)=(187).

Next, in the color conversion processing in step S1103, the CPU 105 causes the command execution unit 205 to convert color data to gray data.

Then, in the RIP processing in step S1104, the CPU 105 causes the command execution unit 205 to convert the gray data to a gray raster image and attribute information.

Finally, in the edge enhancement processing in step S1105, the processing is performed on the gray raster image on a pixel-by-pixel basis. More specifically, the CPU 105 executes the processing in the flowchart of FIG. 25 on each pixel of interest.

Figure 25:
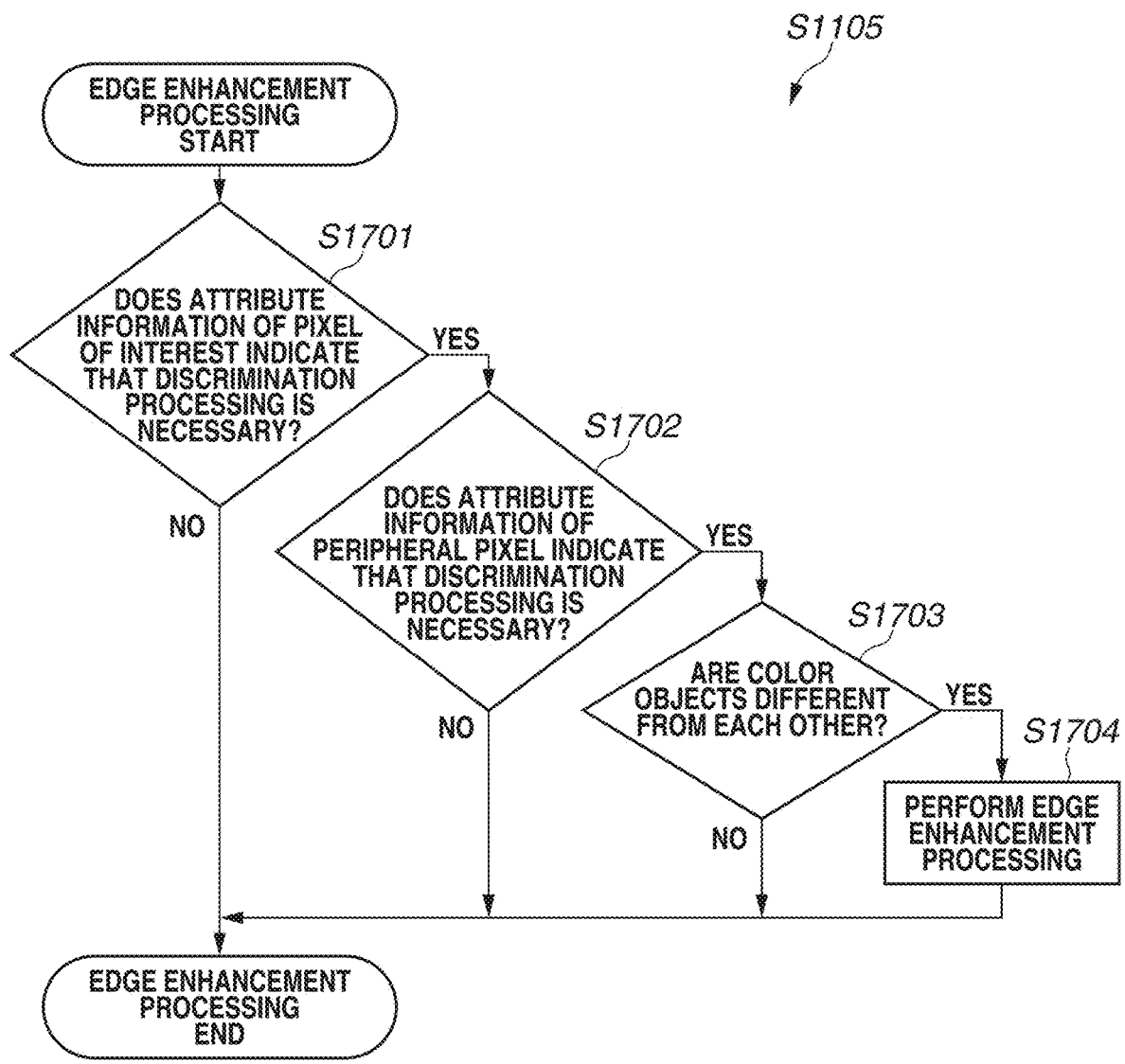
FIG. 25 is a flowchart illustrating processing performed in step S1105 of FIG. 24.

The edge enhancement processing in step S1105 of FIG. 24 will be further described with reference to the flowchart of FIG. 25.

Figure 11:
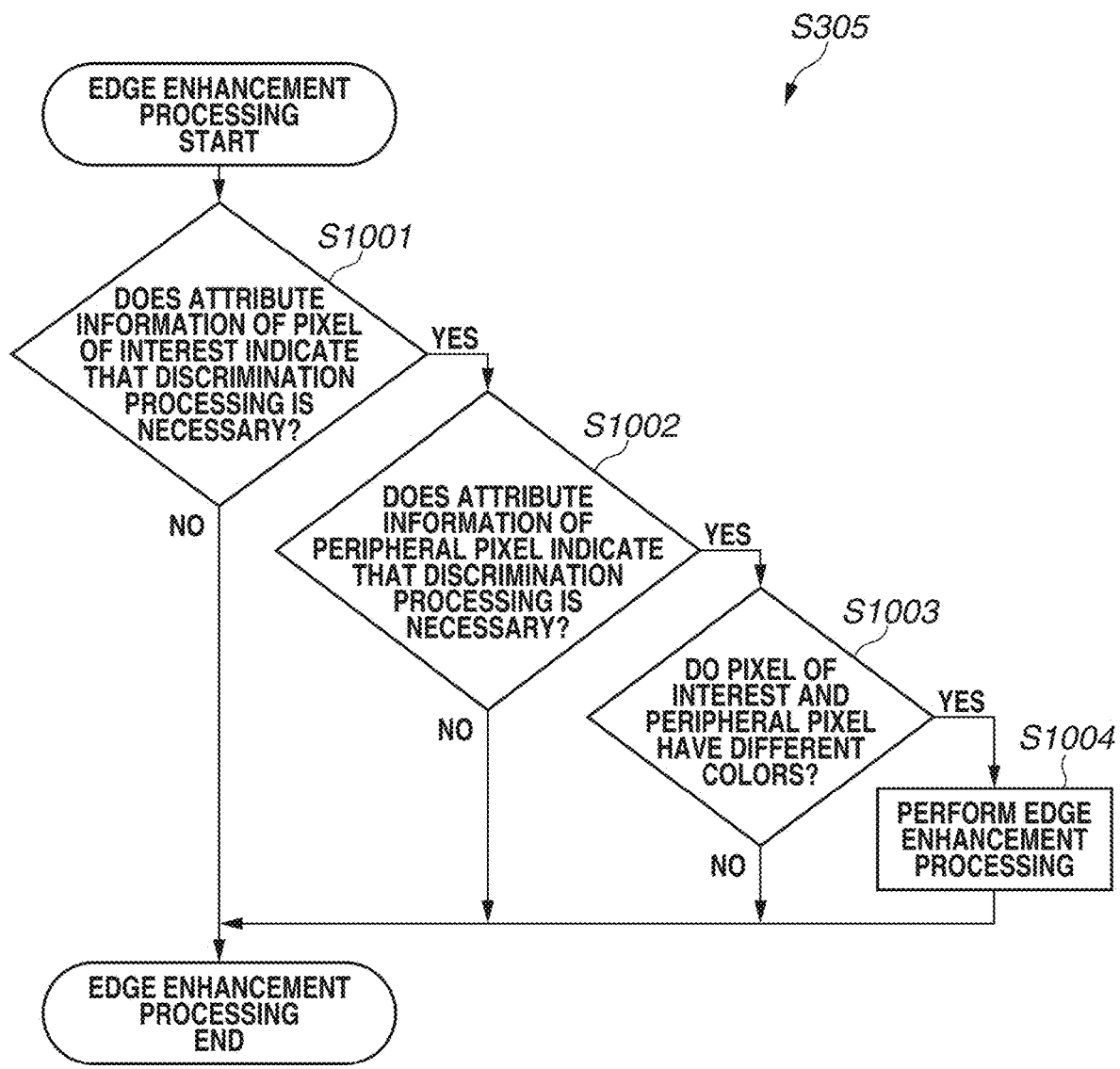
FIG. 11 is a flowchart illustrating processing performed in step S305 of FIG. 7.

First, in step S1701, processing is performed similarly to step S1001 of FIG. 11 according to the first exemplary embodiment, and thus a description thereof will be omitted. The processing in step S1702 is also similar to the processing in step S1002 of FIG. 11 according to the first exemplary embodiment, and thus a description thereof will be omitted. In step S1703, the CPU 105 determines whether the color information of the pixel of interest is different from the color information of the peripheral pixel (whether the color objects are different from each other). In other words, the CPU 105 determines whether the attribute information corrected in the discriminability determination processing in step S1102 is different between the pixel of interest and the peripheral pixel.

The CPU 105 makes the determination by referring to a combination of the bits 4, 6, and 7 of the attribute information corrected in the above-described attribute correction processing. If the combination of the bits 4, 6, and 7 is different between the pixel of interest and the peripheral pixel (YES in step S1703), the processing proceeds to step S1704. If the combination of the bits 4, 6, and 7 is the same between the pixel of interest and the peripheral pixel (NO in step S1703), the processing ends.

Finally, in step S1704, the CPU 105 performs the edge enhancement processing on the gray raster image. In this processing, the one-dimensional LUT or the sharpness processing described in the first exemplary embodiment may be used as the edge enhancement method. The above is the description of the flowchart of FIG. 25.

According to the present exemplary embodiment, the RIP processing in step S1104 and the edge enhancement processing in step S1105 are performed on gray data, thereby reducing the size of the memory and hardware configuration, regardless of whether the present exemplary embodiment is implemented by hardware or software.

While the disclosure has been described with reference to the various examples and exemplary embodiments, the gist and scope of the disclosure are not limited to specific descriptions in the present specification.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-071151, filed Apr. 10, 2020, which is hereby incorporated by reference herein in its entirety.

What is claimed is:

1. An apparatus configured to generate image data represented in achromatic color from input image data and output the generated image data to a printer, the apparatus comprising:
   a controller having one or more processors which execute instructions stored in one or more memories, the controller being configured to:
   replace color information of an object included in the input image data with an achromatic signal value;
   determine, based on an achromatic signal value corresponding to color information of a pixel of interest in the input image data, whether the pixel of interest satisfies a predetermined condition; and
   perform enhancement processing on the color information of the pixel of interest in a case where the pixel of interest is determined not to satisfy the predetermined condition.

2. The apparatus according to claim 1, wherein the controller calculates a difference between the achromatic signal value corresponding to the color information of the pixel of interest and an achromatic signal value corresponding to color information of a pixel adjacent to the pixel of interest, and determines whether the pixel of interest satisfies the predetermined condition by comparing the difference with a threshold.

3. The apparatus according to claim 2, wherein, in a case where the difference is smaller than the threshold, the pixel of interest is determined not to satisfy the predetermined condition and, in a case where the difference is equal to or larger than the threshold, the pixel of interest is determined to satisfy the predetermined condition.

4. The apparatus according to claim 1, wherein, in a case where the pixel of interest is determined not to satisfy the predetermined condition, the controller generates and includes, in attribute information of the pixel of interest, information indicating that the enhancement processing is to be performed.

5. The apparatus according to claim 4, wherein the controller determines whether attribute information includes the information indicating that the enhancement processing is to be performed, and performs the enhancement processing on the color information of the pixel of interest in a case where the attribute information of the pixel of interest and attribute information of a pixel adjacent to the pixel of interest include the information indicating that the enhancement processing is to be performed.

6. The apparatus according to claim 5, wherein the controller determines whether the color information of the pixel of interest is a same as color information of the adjacent pixel, and performs the enhancement processing on the color information of the pixel of interest in a case where the attribute information of the pixel of interest and the attribute information of the adjacent pixel include the information indicating that the enhancement processing is to be performed and the color information of the pixel of interest is the same as the color information of the adjacent pixel.

7. The apparatus according to claim 1, wherein the enhancement processing is trapping processing.

8. The apparatus according to claim 1, wherein the enhancement processing is sharpness processing.

9. The apparatus according to claim 1,
wherein the controller corrects color information of a pixel included in the input image data, and
wherein the controller makes a first correction to the color information of the pixel of interest in a case where the pixel of interest is determined to satisfy the predetermined condition, and makes a second correction different from the first correction to the color information of the pixel of interest in a case where the pixel of interest is determined not to satisfy the predetermined condition.

10. The apparatus according to claim 9, wherein the first correction is processing for converting red (R), green (G), and blue (B) signal values included in the color information of the pixel of interest so that the RGB signal values become the same, and the second correction is processing for converting the RGB signal values included in the color information of the pixel of interest so that all the RGB signal values do not become the same.

11. The apparatus according to claim 8, wherein the enhancement processing is trapping processing.

12. The apparatus according to claim 1, wherein, after performing the enhancement processing, the controller generates the image data represented in achromatic color by replacing color information of the object included in image data corresponding to the input image data with an achromatic signal value.

13. The apparatus according to claim 1, wherein the printer produces an output based on the generated achromatic image data.

14. A method for controlling an apparatus configured to generate image data represented in achromatic color from input image data and output the generated image data to a printer, the method comprising:
replacing color information of an object included in the input image data with an achromatic signal value;
determining, based on an achromatic signal value corresponding to color information of a pixel of interest in the input image data, whether the pixel of interest satisfies a predetermined condition; and
performing enhancement processing on the color information of the pixel of interest in a case where the pixel of interest is determined not to satisfy the predetermined condition.

15. The method according to claim 14, further comprising calculating a difference between the achromatic signal value corresponding to the color information of the pixel of interest and an achromatic signal value corresponding to color information of a pixel adjacent to the pixel of interest, and determining whether the pixel of interest satisfies the predetermined condition by comparing the difference with a threshold.

16. The method according to claim 14, further comprising, in a case where the pixel of interest is determined not to satisfy the predetermined condition, generating and including, in attribute information of the pixel of interest, information indicating that the enhancement processing is to be performed.

17. The method according to claim 14, wherein the enhancement processing is trapping processing.

18. The method according to claim 14, wherein the enhancement processing is sharpness processing.

19. The method according to claim 14, further comprising:
correcting color information of a pixel included in the input image data; and
making a first correction to the color information of the pixel of interest in a case where the pixel of interest is determined to satisfy the predetermined condition, and making a second correction different from the first correction to the color information of the pixel of interest in a case where the pixel of interest is determined not to satisfy the predetermined condition.

20. The method according to claim 14, further comprising, after performing the enhancement processing, generating the image data represented in achromatic color by replacing color information of the object included in image data corresponding to the input image data with an achromatic signal value.

* * * * *